US012432045B2

United States Patent
Wong et al.

(10) Patent No.: US 12,432,045 B2
(45) Date of Patent: Sep. 30, 2025

(54) METHOD AND APPARATUS FOR HIGH PERFORMANCE DATA SIGNING AND ENCRYPTION WITH STREAM WHITENING WITH AN ADVANCED ENCRYPTION STANDARD-ELECTRONIC CODEBOOK (AES-ECB) BLOCK

(71) Applicant: Dell Products, LP, Round Rock, TX (US)

(72) Inventors: Kai Leong Wong, Singapore (SG); Jui Chang Liu, New Taipei (TW); Karthikeyan Krishnakumar, Austin, TX (US)

(73) Assignee: DELL PRODUCTS LP, Round Rock, TX (US)

( * ) Notice: Subject to any disclaimer, the term of this patent is extended or adjusted under 35 U.S.C. 154(b) by 263 days.

(21) Appl. No.: 18/229,753

(22) Filed: Aug. 3, 2023

(65) Prior Publication Data

US 2025/0047470 A1 Feb. 6, 2025

(51) Int. Cl.
*H04L 9/06* (2006.01)
*H04L 9/32* (2006.01)

(52) U.S. Cl.
CPC .......... *H04L 9/0662* (2013.01); *H04L 9/3247* (2013.01); *H04L 2209/80* (2013.01); *H04L 2209/805* (2013.01)

(58) Field of Classification Search
CPC . H04L 9/0662; H04L 9/3247; H04L 2209/80; H04L 2209/805
See application file for complete search history.

(56) References Cited

U.S. PATENT DOCUMENTS

| | | | |
|---|---|---|---|
| 2007/0263861 A1* | 11/2007 | Kiyomoto | H04L 9/0668 380/46 |
| 2009/0220083 A1* | 9/2009 | Schneider | H04L 9/0662 380/42 |
| 2012/0076293 A1* | 3/2012 | Smith | H04L 9/0656 380/28 |
| 2012/0308008 A1 | 12/2012 | Kondareddy | |
| 2015/0264626 A1 | 9/2015 | Perdomo | |
| 2015/0264627 A1 | 9/2015 | Perdomo | |
| 2015/0271178 A1 | 9/2015 | Bhattacharya | |
| 2017/0187539 A1 | 6/2017 | Thompson | |

(Continued)

*Primary Examiner* — David J Pearson
(74) *Attorney, Agent, or Firm* — Prol Intellectual Property Law, PLLC; Kenneth Prol

(57) ABSTRACT

A wireless input/output (I/O) device wirelessly coupled to a wireless dongle of an information handling system to encrypt and transmit a data packet frame in response to a transmitted polling packet from a wireless dongle requesting a selected number of packets of a selected packet length. The microcontroller executing code instructions to sign and encrypt the selected number of data packets generating a signature and generating an LFSR distributed signature and an LFSR distributed payload. An encryption algorithm used with an initial or dynamic key and shifting state machine output of another pair of LFSRs generates a data packet encryption output value that is applied via an exclusive OR operator to the LFSR distributed signature and payload to encrypt the data packet and the data packet encryption output value is used for encryption of the next data packet until the selected number of packets of the frame are encrypted.

20 Claims, 7 Drawing Sheets

(56) References Cited

U.S. PATENT DOCUMENTS

| | | | |
|---|---|---|---|
| 2017/0202027 A1* | 7/2017 | Son | H04L 67/12 |
| 2018/0014241 A1 | 1/2018 | Perdomo | |
| 2018/0253559 A1 | 9/2018 | Satpathy | |
| 2020/0244434 A1* | 7/2020 | Pedersen | H04L 9/0631 |
| 2022/0225092 A1* | 7/2022 | Malek-Mohammadi | H04W 12/06 |
| 2023/0096468 A1* | 3/2023 | Ong | H04L 47/2441 370/235 |

* cited by examiner

METHOD AND APPARATUS FOR HIGH PERFORMANCE DATA SIGNING AND ENCRYPTION WITH STREAM WHITENING WITH AN ADVANCED ENCRYPTION STANDARD-ELECTRONIC CODEBOOK (AES-ECB) BLOCK

FIELD OF THE DISCLOSURE

The present disclosure generally relates to wireless peripheral input/output (I/O) devices, such as mice, keyboards, earbuds, headphones, headsets, and virtual reality peripherals as well as other wireless peripheral devices. More specifically, the present disclosure relates to data signing of wireless communication from a wireless dongle of an information handling system to wireless peripheral I/O devices and from a wireless peripheral I/O devices to a wireless dongle.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling needs and requirements vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may be operatively coupled, wirelessly, to one or more wireless peripheral I/O devices such as a keyboard, mouse, touchpad, display device, wearable peripheral device, speakers, earbud, headphone, microphone, or other peripheral devices.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
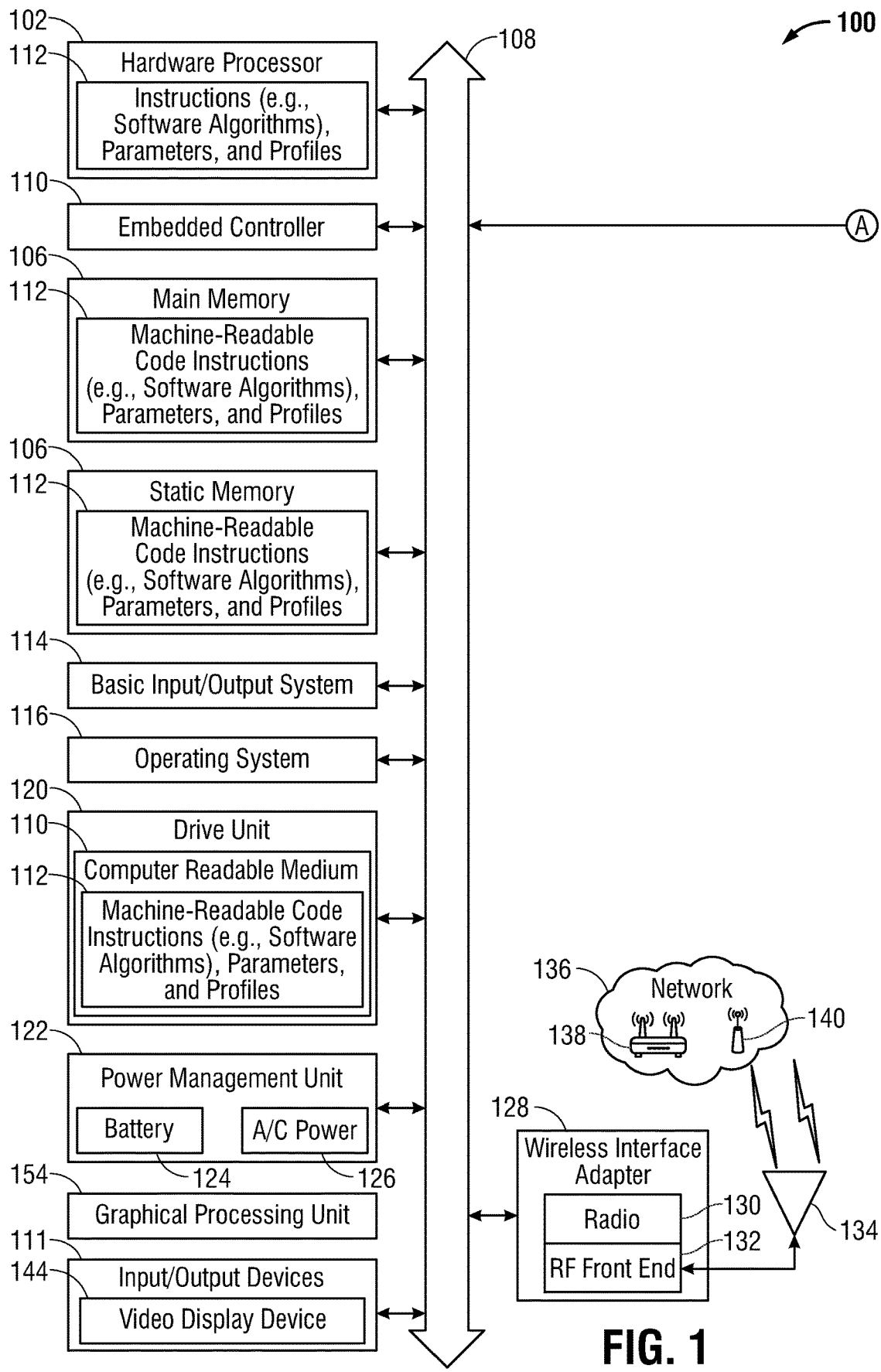
FIG. 1 is a block diagram of an information handling system including a wireless dongle and a wirelessly-coupled wireless I/O device that each execute code instructions of a wireless I/O data signing protocol and authenticated encryption system or agent executable by a hardware controller for securely transmitting data between the wireless I/O device and wireless dongle according to an embodiment of the present disclosure.
Figure 1:
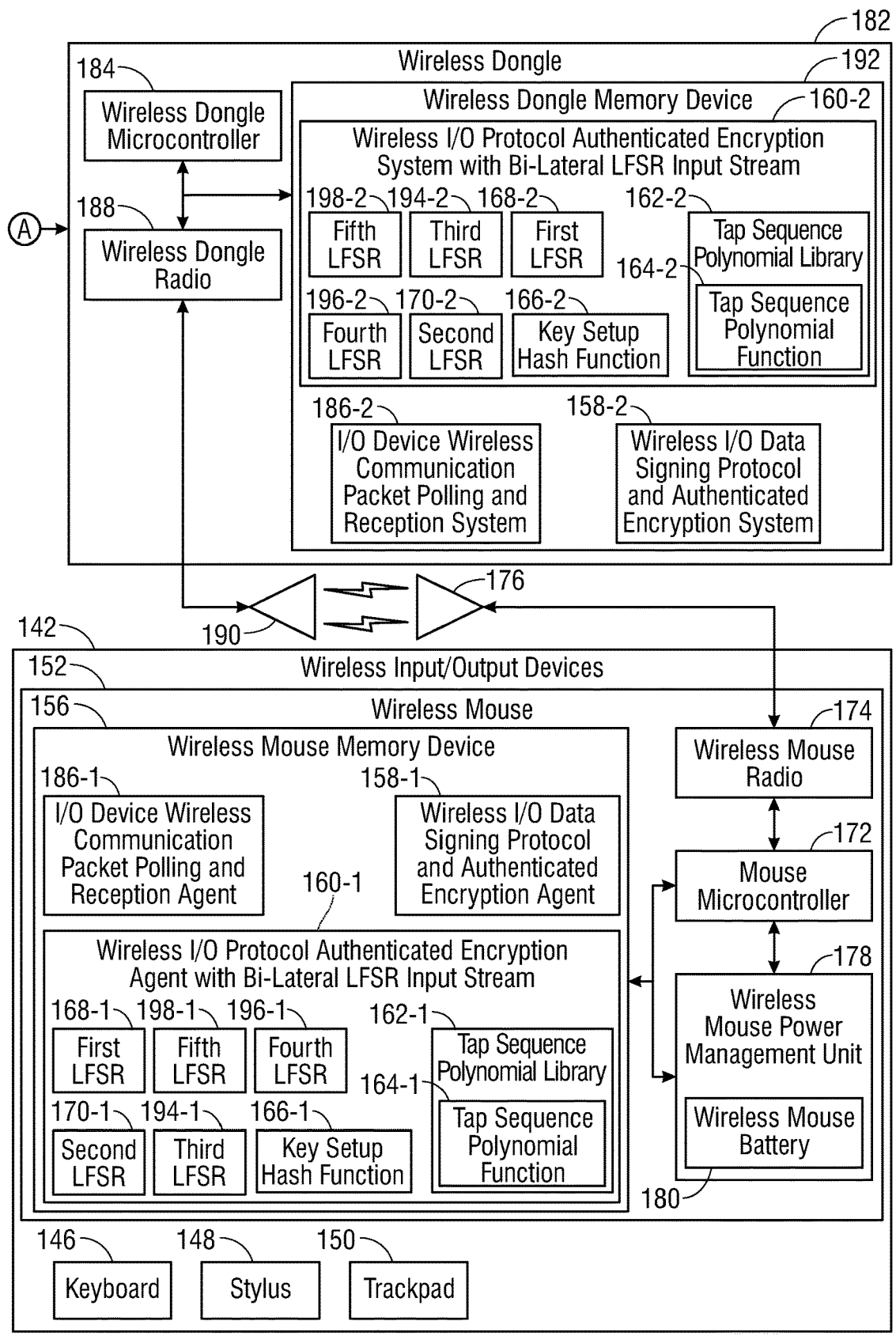

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Users of information handling systems such as smart phones, tablets, or laptops may employ a plurality of wireless peripheral input/output (I/O) devices also referred to as wireless I/O devices herein (e.g., mouse, keyboard, earbuds, headphones, smart speakers, headsets including headphones and speakers, or virtual reality peripherals) located remotely from the information handling system to wirelessly transmit and receive I/O data such as keystrokes, mouse positional data, or audiovisual information. Many existing systems employ a wireless communication adapter/dongle operably connected to the information handling system (e.g., desktop, laptop, or tablet computer) to pair with and communicate wirelessly with one or more of these wireless I/O devices. In other embodiments, a wireless communication adapter/dongle may be integrated as part of the wireless radio adapter internal to the information handling system for pairing with and communicating wirelessly with one or more of these wireless I/O devices. Many manufacturers of these wireless I/O devices build these devices to provide the most basic or rudimentary communication capabilities, for example, that comply with the Bluetooth® Low Energy (BLE) communication standard.

For example, many existing wireless I/O devices are designed to communicate with a wireless communication adapter/dongle using a one reception/one transmission (1TX/1RX) format that requires a wireless communication adapter/dongle to respond to every data packet received from a wireless I/O device by transmitting an acknowledgment (ACK) data packet. In other words, each time the wireless communication adapter/dongle operating in receive mode receives a data packet, it must then switch to transmit mode and transmit an ACK data packet back to the wireless I/O device from which the initial data packet was received. The wireless communication adapter/dongle may then switch back to a receive mode to receive the next data packet from the wireless I/O device. This process may be repeated each time a new data packet is generated at the wireless I/O device, for example. Each of these transmission/reception mode switches consumes power, requires more airtime for acknowledgments, and causes a high potential for collision between incoming wireless I/O device data packets and outgoing ACK data packets. In the case of such a collision, the wireless communication adapter/dongle may fail to transmit an ACK data packet (as no data packet has been received by the dongle from the wireless I/O device due to the collision), and the wireless I/O device may then either resend the missed data packet or skip this resend and simply transmit the next available data packet. Such a 1TX/1RX system may be limited in data throughput and consume power unnecessarily for such transmit and receive switches during operations. Such systems may cause the customer to experience slow response from a wireless I/O device, a lag between their input via the wireless I/O device (e.g., movement of the mouse) and the corresponding feedback displayed by the information handling system (e.g., movement of the cursor), or may cause the cursor to jump suddenly from one position to another (e.g., when the wireless mouse opts to skip resend of the missed packet). As a result, existing systems employing this 1TX/1RX approach may fail to meet customer needs during execution of latency-sensitive software applications such as gaming applications or other high-definition audio/visual applications.

The I/O device wireless communication packet polling and reception agent in embodiments of the present disclosure orchestrate scheduled delivery of a plurality of data packets from each of one or more wireless I/O devices in a data packet communication frame between delivery of acknowledgement (ACK) data packets to each of those one or more wireless I/O devices in 1 TX/1 RX systems. In embodiments of the present disclosure, a wireless radio adapter, such as in a wireless dongle, may receive a request to connect from one or more wireless I/O devices (e.g., mouse and headset), and may respond by transmitting a polling packet that instructs each of the wireless I/O devices paired with the wireless dongle to transmit a selected number of data packets of a selected length and at specified time slots during a first data packet communication frame between the wireless communication adapter/dongle and each of the paired wireless I/O devices. The I/O device wireless communication packet polling and reception agent selects the number of data packets and length of data packets according to embodiments herein. A microcontroller executing code instructions of the I/O device wireless communication packet polling and reception agent at the wireless dongle may ensure that, during this first data packet communication frame in which time slots have been allocated to the one or more wireless I/O devices (e.g., mouse and headset), the wireless radio system, such as in the wireless dongle, remains in a receive mode to receive data packets from the one or more paired wireless I/O devices in accordance with the number of packets prescribed and the duration (e.g., based on packet lengths) prescribed as suitable for an executing software application from each of the one or more wireless I/O devices. In other words, the controller of the wireless dongle or other wireless radio adapter may avoid any power loss from additional airtime or inadvertent collision threat due to rapid switching between RX/TX modes during this first data packet communication frame.

Following the first data packet communication frame at the end of a time period determined by the number of packets expected, packet lengths, and any spacing time, the controller of the wireless dongle or other wireless radio adapter executing code instructions of the I/O device wireless communication packet polling and reception agent may switch to transmit mode and transmit to each of the paired wireless I/O devices an acknowledgement packet identifying the number of packets received during the first data packet communication frame from each of the paired wireless I/O devices. In addition, this acknowledgement packet may further include instructions for the one or more paired wireless I/O devices to transmit a selected, specified plurality of data packets of a selected length prescribed and at specified time slots during a second data packet communication frame between the wireless dongle and each of the paired wireless I/O devices. This selected number of packets, packet lengths, and specified time slots may remain the same as in the first data packet communication frame or may be adjusted according to various embodiments for the second data packet communication.

Still further, even where these issues associated with data packet transmission rates have been alleviated, these transmissions may still not be securely signed and encrypted to prevent third-party acquisition or interference of these data packets. Indeed, as the transmission rate of data packets is increased, the ability to sign and encrypt this data in time to deliver these data packets more quickly is also limited. The present specification describes code instructions of a wireless I/O data signing protocol and authenticated encryption agent and wireless input/output (I/O) protocol authenticated encryption system with bi-lateral linear-feedback shift register (LFSR) input stream that, when executed by a microcontroller, allows for quick and secure signing and encryption of each data packet sent from a wireless I/O device to a wireless dongle or from a wireless dongle to a wireless I/O device.

In an embodiment, a hardware processing device (e.g., microcontroller) of, for example, the wireless dongle transmits a polling packet, via a wireless dongle radio, with a selected number of packets and a selected packet length to a wireless I/O device for a packet data stream. The microcontroller of the wireless I/O device may transmit the packet data stream in a data packet communication frame and may include the selected number of packets in a data packet communication frame at one time to a wireless I/O device thereby decreasing the frequency of each of the wireless I/O device and wireless dongle performing a transmission/reception mode switch. The microcontroller of the wireless I/O device may respond with an acknowledgement of received selected number of data packets from the operatively coupled wireless I/O device including instructions to receive a next packet communication frame of the selected number of packets at the selected packet lengths in a second polling packet via a wireless link. The packet communication frame may be defined as the selected number of packets with the selected packet length during a transmission from one of the wireless I/O devices. The selected number of data packets included in each of the data packet communication frames may be signed and encrypted packet by packet according to embodiments of the present disclosure. Similarly, the selected number of data packets included in each of the data packet communication frames may be unencrypted and authenticated via the signed data packet by packet according to embodiments of the present disclosure.

In an embodiment, the execution of the wireless I/O data signing protocol and authenticated encryption agent by the microcontroller causes each data packet, defined by a selected length (e.g., 8 bytes) to be signed prior to any encryption. For example, the microcontroller may execute a modular inverse function using a selected prime number to the first data packet of the payload (e.g., 8 bytes of data) to generate a signature that may be later used to authenticate the first data packet when received by the wireless dongle. The execution of the wireless I/O data signing protocol and authenticated encryption agent by the microcontroller may further cause a first linear-feedback shift register (LFSR) to be applied to the signature with a first tap and apply an exclusive OR (XOR) operator to the first LFSR and signature output using a session counter that increases with each data packet frame to generate an LFSR distributed signature while a second LFSR is applied to the payload with a second tap to generate an LFSR distributed payload. This creates a unique signature that is tied to each individual data packet prior to the data packet being encrypted and transmitted to the wireless dongle (or wireless I/O device where applicable) and a scrambled data payload. This allows for a session-based signing of each packet that can differentiate each payload from each other even where repeated payload is present within the data stream.

Concurrently or at a near time, the execution of the wireless I/O protocol authenticated encryption system with bi-lateral LFSR input stream by the microcontroller at the wireless I/O device causes the microcontroller to generate an initial key using a key setup hash function with a dongle nonce received from the dongle and a wireless device nonce as input to the key setup hash function. Additionally, the execution of the code instructions of the wireless I/O protocol authenticated encryption system with bi-lateral LFSR input stream by the microcontroller causes the microcontroller to generate a 16-byte state machine output from each of a third LFSR and a fourth LFSR using tap sequence polynomial functions for separately shifting each of those third and fourth LFSRs. The 16-byte state machine output from each of a third LFSR and a fourth LFSR and the initial key, or later dynamic keys, are used with a single AES-ECB encryption algorithm to generate a data encryption output value (SF) in an embodiment.

The execution of the wireless I/O protocol authenticated encryption system with bi-lateral LFSR input stream causes the microcontroller to execute an encryption algorithm using the initial key and 16-byte state machine output from each of a first LFSR and a second LFSR as parameters and provide a first data packet encryption output value (SF) to encrypt a first packet among the number of packets. The first data packet encryption output value (SF), the LFSR distributed signature with the LFSR distributed payload for the wireless I/O device input data, and a whitening value (W) are run with an exclusive-OR (XOR) function to generate a first encrypted packet payload for the first encrypted packet of the selected number of data packets in the packet communication frame. Use of the LFSR distributed signature with the LFSR distributed payload and scrambling of data therein helps to mask the wireless I/O device input data payload among data packets from a third party attack. The encryption algorithm then uses the first data packet encryption output value as a subsequent dynamic key and shifted output from each of the third LFSR and fourth LFSR as the parameters to generate a next data packet encryption output value used with an XOR operator to encrypt a second data packet that has been converted into a second LFSR distributed signature with the LFSR distributed payload among the number of packets and so forth. Because the encryption algorithm and method described herein quickly encrypts the data packets, the rate of encrypted and secure data packet delivery may be increased thereby increasing the transmission of data packets while still securing the data being transmitted. In an embodiment, the transmission rate of encrypted data packets may still meet or exceed a 4 KHz packet rate thereby allowing for the wireless I/O device to deliver I/O data at a relatively quicker rate during, for example, gaming experiences and the like.

FIG. 1 illustrates an information handling system 100 similar to information handling systems according to several aspects of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a convertible laptop, a tablet, a smartphone, a communications device, an access point (AP), a base station transceiver, a wireless telephone, a control system, a camera, a scanner, a printer, a personal trusted device, a web appliance, or any other suitable machine capable of executing a set of instructions (sequential or otherwise) that specify actions to be taken by that machine, and can vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the computer system 100 can be implemented using electronic devices that provide voice, video, or data communication. For example, an information handling system 100 may be any mobile or other computing device capable of executing a set of instructions (sequential or otherwise) that specify actions to be taken by that machine. In an embodiment, the information handling system 100 may be operatively coupled to a server or other network device. Further, while a single information handling system 100 is illustrated, the term "system" shall also be taken to include any collection of systems or sub-systems that individually or jointly execute a set, or multiple sets, of instructions to perform one or more computer functions.

The information handling system 100 may include memory (volatile (e.g., random-access memory, etc.), non-volatile (read-only memory, flash memory etc.) or any combination thereof), one or more hardware processing resources, such as a central processing unit (CPU), a graphics processing unit (GPU) 154, an embedded controller (EC) 104, a hardware processor 102, hardware controllers, or any combination thereof. In an embodiment, the hardware processor 102 may include a central processing unit (CPU) that participates in a booting process to invoke and execute pre-boot and boot firmware, and an operating system (OS) 116 described herein. Additional components of the information handling system 100 can include one or more storage devices, one or more communications ports for communicating with external devices, as well as various wireless input and output (I/O) devices 142, such as a keyboard 146, a mouse 152, a video display device 144, a stylus 148, a trackpad 150, or any combination thereof. In an embodiment, any of these I/O devices may also be wired I/O devices 111 such as a video display device 144 for example. The information handling system 100 can also include one or more buses 118 operable to transmit data communications between the various hardware components described herein. Portions of an information handling system 100 may themselves be considered information handling systems and some or all of which may be wireless.

Information handling system 100 can include devices or modules that embody one or more of the devices or execute instructions for the one or more systems, agents, and modules described above and operates to perform one or more of the methods described herein. The information handling system 100 may execute machine-readable code instructions 112 via the described hardware processing resources that may operate on servers or systems, remote data centers, or on-box in individual client information handling systems according to various embodiments herein. In some embodiments, it is understood any or all portions of machine-readable code instructions 112 may operate on a plurality of information handling systems 100.

As described herein, the information handling system 100 may include hardware processing resources such as a hardware processor 102, a central processing unit (CPU), accelerated processing unit (APU), an EC 104, a neural processing unit (NPU), a vision processing unit (VPU), a digital signal processor (DSP), a GPU 154, a microcontroller, or any other type of hardware processing device that executes code instructions to perform some of the processes described herein. Any of the hardware processing resources may operate to execute code that is either firmware or software code. Moreover, the information handling system 100 can include memory devices such as main memory 106, static memory 108, computer readable medium 110 storing machine-readable code instructions 112 (e.g., embodied as firmware in some embodiments) of, in an example embodiment, wireless peripheral device (PD) drivers, or other computer executable program code and firmware, and drive unit 120 (volatile (e.g., random-access memory, etc.), non-volatile (read-only memory 176, flash memory etc.) or any combination thereof). These memory devices may be accessed by any of the hardware processors (e.g., the CPU) described herein to access computer-readable program code of wireless I/O device drivers or other software and firmware to facilitate the wireless communication between a wireless interface adapter 128 or a wireless dongle radio 188 with a wireless I/O device such as a wireless mouse 152 as described herein. In the present specification and in the appended claims, the term "module" is meant to include that firmware, software, and/or a combination of firmware and software that is used during pre-boot, boot, and runtime stages as described herein. In an embodiment, the modules may be stored on a read-only memory device. It is appreciated, as well, that any of the modules described herein may be stored on a single or multiple memory devices and may be addressable by the CPU (e.g., hardware processor 102).

As shown, the information handling system 100 may further include a video display device 144. The video display device 144, in an embodiment, may function as a liquid crystal display (LCD), an organic light emitting diode (OLED), a flat panel display, or a solid-state display. Although FIG. 1 shows a single video display device 144, the present specification contemplates that multiple video display devices 144, any of which may be wired or wireless, may be used with the information handling system to facilitate an extended desktop scenario, for example. Additionally, the information handling system 100 may include one or more input/output devices 142 including an alpha numeric input device such as a keyboard 146 and/or a cursor control device, such as a wireless mouse 152, touchpad/trackpad 150, a stylus 148, or a gesture or touch screen input device associated with the video display device 144 that allow a user to interact with the images, windows, and applications presented to the user.

A network interface device of the information handling system 100 shown as wireless interface adapter 128 can provide radio connectivity among devices such as with Bluetooth® or, in embodiments here Bluetooth® Low Energy (BLE), to a wireless I/O device and/or network 136, e.g., a wide area network (WAN), a local area network (LAN), wireless local area network (WLAN), a wireless personal area network (WPAN), a wireless wide area network (WWAN), or other network. In an embodiment, the WAN, WWAN, LAN, and WLAN may each include an access point 138 or base station 140 used to operatively couple the information handling system 100 to a network 136. Wireless interface adapter 128 may include one or more radio frequency (RF) subsystems (e.g., radio 130) with transmitter/receiver circuitry, modem circuitry, one or more radio frequency (RF) front end 132 circuits, one or more wireless controller circuits, amplifiers, antennas 134 and other circuitry of the radio 130 such as one or more antenna ports used for wireless communications via multiple radio access technologies (RATs). In an embodiment, the wireless interface adapter 128 may operate in accordance with any wireless data communication standards. To communicate with a wireless local area network, standards including IEEE 802.11 WLAN standards (e.g., IEEE 802.11ax-2021 (Wi-Fi 6E, 6 GHZ)), IEEE 802.15 WPAN standards, WWAN such as 3GPP or 3GPP2, Bluetooth® standards, or similar wireless standards may be used for radio layer connectivity. It is appreciated that the wireless interface adapter 128 may also be used to communicate with a wireless I/O device such as the wireless mouse 152 described herein using BLE radio layer protocol at, for example, the 2.4 GHz band and as modified by the wireless I/O device communication protocol described in embodiments herein.

As described herein, the information handling system 100 includes a hardware processor 102 used to generate computer readable instructions to a wireless dongle 182 to communicate with a wireless I/O device such as the wireless mouse 152. The present specification contemplates that other hardware processing devices may be used to conduct this communication process such as a wireless dongle microcontroller 184 executing instructions for a wireless dongle radio 188 to communicate with the wireless mouse 152 or other wireless I/O devices 142 or a wireless IO device microcontroller in the wireless mouse 152 or other wireless I/O devices 142.

In an embodiment, the information handling system 100 can include one or more sets of machine-readable code instructions, parameters, and profiles 112 that can be executed to cause the computer system to perform any one or more of the methods or computer-based functions disclosed herein. For example, machine-readable code instructions, parameters, and profiles 112 may execute, via hardware processing resources, various software applications, software agents, the BIOS 114 firmware and/or software, or other aspects or components. Machine-readable code instructions, parameters, and profiles 112 may execute, via the information handling system 100, the wireless data package encryption system that is used to engage in wireless communication with the wireless mouse 152 as well as decrypt and/or encrypt data packets according to the embodiments described herein. Again, the machine-readable code instructions, parameters, and profiles 112 described herein may be stored on a non-volatile memory device and made accessible to the EC 104, the hardware processor 102, a microcontroller unit (MCU), or other hardware processing resource for execution. Various software modules comprising application instructions of machine-readable code instructions, parameters, and profiles 112 may be coordinated by an operating system (OS) 116, and/or via an application programming interface (API). An example OS 116 may include Windows®, Android®, and other OS types known in the art. Example APIs may include Win 32, Core Java API, or Android APIs.

In an embodiment, the disk drive unit 120 and may include machine-readable code instructions, parameters, and profiles 112 in which one or more sets of machine-readable code instructions, parameters, and profiles 112 such as software can be embedded to be executed by the processor 102 or other hardware processing devices such as a GPU 154 to perform the processes described herein. Similarly, main memory 106 and static memory 108 may also contain a computer-readable medium for storage of one or more sets of machine-readable code instructions, parameters, or profiles 112 described herein. The disk drive unit 120 or static memory 108 also contain space for data storage. Further, the machine-readable code instructions, parameters, and profiles 112 may embody one or more of the methods as described herein. In a particular embodiment, the machine-readable code instructions, parameters, and profiles 112 may reside completely, or at least partially, within the main memory 106, the static memory 108, and/or within the drive unit 120 during execution by the hardware processor 102, EC 104, or GPU 154 of information handling system 100. The main memory 106, GPU 154, EC 104, and the hardware processor 102 also may include computer-readable media.

Main memory 106 or other memory of the embodiments described herein may contain computer-readable medium (not shown), such as RAM in an example embodiment. An example of main memory 106 includes random access memory (RAM) such as static RAM (SRAM), dynamic RAM (DRAM), non-volatile RAM (NV-RAM), or the like. The information handling system 100 may also have read-only memory (ROM), another type of memory, or a combination thereof. Static memory 108 may contain computer-readable medium (not shown), such as NOR or NAND flash memory in some example embodiments. The applications and associated APIs, for example, may be stored in static memory 108 or on the disk drive unit 120 that may include access to a machine-readable code instructions, parameters, and profiles 112 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of machine-readable code instructions. The term "computer-readable medium" shall also include any medium that is capable of storing, encoding, or carrying a set of machine-readable code instructions for execution by a processor or that cause a computer system to perform any one or more of the methods or operations disclosed herein.

In an embodiment, the information handling system 100 may further include a power management unit (PMU) 122 (a.k.a. a power supply unit (PSU)). The PMU 122 may include a hardware controller and executable machine-readable code instructions to manage the power provided to the components of the information handling system 100 such as the hardware processor 102, and other hardware components described herein. The PMU 122 may control power to one or more components including the wireless dongle 182, the wireless interface adapter 128, the one or more drive units 120, the hardware processor 102 (e.g., CPU), the EC 104, the GPU 154, a video/graphic display device 144, or other wired input/output devices 142 such as the stylus 148, a mouse 152, a keyboard 146, and a trackpad 150 and other components that may require power when a power button has been actuated by a user. In an embodiment, the PMU 122 may monitor power levels and be electrically coupled, either wired or wirelessly, to the information handling system 100 to provide this power and coupled to bus 118 to provide or receive data or machine-readable code instructions. The PMU 122 may regulate power from a power source such as a battery 124 or AC power adapter 126. In an embodiment, the battery 124 may be charged via the AC power adapter 126 and provide power to the components of the information handling system 100, via wired connections as applicable, or when AC power from the AC power adapter 126 is removed. PMU 122 may include a hardware controller to operate with the EC 104 separately or together to execute machine-readable code instructions, parameters, and profiles 112 described herein at the information handling system 100.

In a particular non-limiting, exemplary embodiment, the computer-readable medium can include a solid-state memory such as a memory card or other package that houses one or more non-volatile read-only memories or volatile type memory. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or machine-readable code instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit.

Accordingly, the present system encompasses hardware resources executing software or firmware, as well as hardware implementations.

When referred to as a "system," a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include hardware processing resources executing software, including firmware embedded at a device, such as an Intel® brand processor, AMD® brand processors, ARM® brand processors, Qualcomm® brand processors, or other processors and chipsets, or other such hardware device capable of operating a relevant software environment of the information handling system. The system, device, controller, or module can also include a combination of the foregoing examples of hardware or hardware executing software or firmware. Note that an information handling system can include an integrated circuit or a board-level product having portions thereof that can also be any combination of hardware and hardware executing software. Devices, modules, hardware resources, or hardware controllers that are in communication with one another need not be in continuous communication with each other, unless expressly specified otherwise. In addition, devices, modules, hardware resources, and hardware controllers that are in communication with one another can communicate directly or indirectly through one or more intermediaries.

As described herein, the information handling system 100 may be operatively coupled to a wireless I/O device or other I/O device. The wireless coupling of the information handling system 100 to the wireless I/O device may be accomplished, in one embodiment, via operation of the wireless interface adapter 128, radio 130, and RF front end to communicate with any wireless I/O device 142 via a BLE 2.4 GHz band. In another embodiment, the wireless coupling of the information handling system 100 to the wireless I/O device may be accomplished, in one embodiment, via operation of a wireless dongle radio 188 and wireless dongle antenna 190 of wireless dongle 182 to communicate with any wireless I/O device 142 via a BLE 2.4 GHz band. Therefore, the wireless communication may be conducted using an internal wireless communication system within the information handling system 100 or via a wireless dongle 182 operatively coupled to the information handling system 100 via a USB port or other wired connection. It is further appreciated that any wired I/O device 111 or wireless I/O device 142 may provide input to and receive output from the information handling system 100. For case of description, however, the present specification will describe the wireless I/O device or wireless I/O device as a wireless mouse 152 or wireless keyboard 146. Additionally, for case of description, the present specification will describe the wireless mouse 152 operatively and wirelessly coupled to a wireless dongle 182 as an example embodiment in order to send and receive data packets to and from the information handling system.

As described herein, the information handling system 100 in an embodiment is operably coupled to the wireless dongle 182, which may orchestrate scheduled delivery of a plurality of data packets from any number of wireless input/output (I/O) devices such as the wireless mouse 152 or wireless keyboard 146 during separately scheduled data packet communication frames according to various embodiments of the present disclosure. The wireless mouse 152, in an example embodiment, includes a wireless mouse battery 180 and a wireless mouse power management unit (PMU) 178. The wireless mouse PMU 178 may include a hardware controller and executable machine-readable code instructions to manage the power provided to the components of the wireless mouse 152 such as the mouse microcontroller 172, the wireless mouse memory device 156, and other hardware components described herein. In an embodiment, the wireless mouse PMU 178 may monitor power levels and be electrically coupled within the wireless mouse 152 to provide this power to provide or receive data or machine-readable code instructions. The wireless mouse PMU 178 may regulate power from a power source such as the wireless mouse battery. The wireless mouse PMU 178 may include a hardware controller or the wireless mouse microcontroller 172 to execute machine-readable code instructions, parameters, and profiles described herein at the wireless mouse 152.

The wireless mouse 152 may further include computer-readable program code of an I/O device wireless communication packet polling and reception agent 186-1, a wireless I/O protocol authentication encryption system with bi-lateral LFSR input stream 160-1, and a wireless I/O data signing protocol and authenticated encryption agent 158-1. The execution of the I/O device wireless communication packet polling and reception agent 186-1 as described herein, causes the wireless mouse to receive a polling packet from the wireless dongle 182 that indicates that a selected number of packets with a selected packet length and within specified time slots for a data packet communication frame to be transmitted by the wireless mouse 152 or other wireless I/O device 142. As described herein, this relieves the wireless mouse 152 (and wireless dongle 182) from having to switch between a data transmission state and a data reception state relatively more frequently. This allows for these data packets to be sent to the wireless dongle 182 from the wireless mouse 152, or from the wireless dongle 182 to the wireless mouse 152, relatively quicker than if the packets were sent an a 1TX/1RX fashion.

The execution of the wireless I/O protocol authentication encryption agent with bi-lateral LFSR input stream 160-1 by the microcontroller of the wireless mouse 152 as described herein, causes each data packet within the packet communication frame to be encrypted prior to transmission of these packets within a data packet stream. This encryption method allows for a quicker method of encrypting the data packets within the data packet communication frame so that the speed of transmission of these data packets from the wireless mouse 152 to the wireless dongle 182 is not reduced thereby allowing for the secure and quick transmission these packets. Still further, the execution of the wireless I/O data signing protocol and authenticated encryption agent 158-1 by the wireless mouse microcontroller 172 also provides for signing of the data packets, packet by packet, prior to delivery to the wireless dongle 182 and wireless mouse 152, respectively. The execution of the wireless I/O data signing protocol and authenticated encryption agent 158-1, more specifically, creates a signature to be appended to a portion of the payload of a data packet in which a first LFSR 168-1 and second LFSR 170-1 used to further create pseudo-random bytes within the signature and the payload prior to the encryption of this data. The execution of the wireless I/O data signing protocol and authenticated encryption agent 158-1 by the microcontroller may further cause a first LFSR 168-1 to be applied to the signature with a first tap and apply an exclusive OR (XOR) operator to the first LFSR 168-1 and signature output using a session counter that increases with each data packet frame to generate an LFSR distributed signature while a second LFSR 170-1 is applied to the wireless IO device input data payload with a second tap to generate an LFSR distributed payload. By adding the signature and creating the pseudo-random bytes within the LFSR distributed signature and LFSR distributed payload, a third party who accesses the transmission may not be able to detect the location of the payload or information in the payload. In an embodiment and after the XOR encryption applied to the signature output, a third-party having access to the encrypted packet will not be able to reverse-engineer, decrypt, or otherwise detect the payload or apply any bits tampering methods on the payload. Additionally, if the third-party was to change the data, the wireless dongle, upon receipt and decryption of the payload and signature within the data packet will know via the authentication of the signing that data has been changed thereby allowing the wireless dongle 182 to discard the tampered with data without informing the wireless mouse 152 of the data being tampered with at the wireless mouse 152 for example. This prevents any silent third-party attacker from observing and monitoring for tampered-data notifications and attempting to find loopholes within the methods and systems described herein.

The execution of the wireless I/O protocol authenticated encryption agent with bilateral LFSR input stream by the microcontroller may further cause a third LFSR 194-1 and a fourth LFSR 196-1 to generate a shifting state machine value to be encrypted with an initial key or dynamic key using a single AES-ECB encryption algorithm to generate a data packet encryption value (SF). This data packet encryption value SF is used with an XOR operator be applied to LFSR distributed signature and LFSR distributed payload, along with a whitening function value in some embodiments, to provide an encrypted wireless IO device data packet. Further the data encryption value (SF) generated may be used as a dynamic key in a next round of encryption for a second wireless IO device data packet replacing the initial key value above.

The wireless dongle 182 or integrated wireless radio adapter of the information handling system 100 in an embodiment may house a microcontroller 150 executing firmware instructions of an I/O device wireless communication packet polling and reception system 186-2 in an embodiment. The wireless dongle 182 or integrated wireless radio adapter of the information handling system 100 in an embodiment may also house a microcontroller 150 executing firmware instructions of a wireless I/O protocol authentication encryption system with bi-lateral LFSR input stream 160-2. The wireless dongle 182 may be a dongle in one embodiment that is operatively coupled to the information handling system 100 through insertion of the wireless dongle 182 within a USB port of the information handling system 100, for example. In another embodiment, the wireless dongle 182 may be incorporated within the housing of the information handling system 100 as part of an integrated wireless radio adapter and operatively coupled to the bus 118 of the information handling system 100 through one of several means for transmitting data, including connection through a USB hub, a Thunderbolt hub, or any other type of data transfer hub.

The wireless dongle 182 and its wireless dongle radio 188 and wireless dongle antenna 190 or may transmit and receive information necessary to pair the wireless mouse 150 with the information handling system 100, such as, for example, pairing or wireless communication profiles for pairing the information handling system 100 and the wireless mouse 152. Such pairing or wireless communication profiles may operate to identify the wireless mouse 152 as a device authorized to transceive data with the information handling system 100 under the paired wireless protocol, as well as information sufficient to identify the wireless mouse 152, such as a Media Access Control (MAC) address, IP address, or model number, among other identifying data.

The present disclosure contemplates a computer-readable medium that includes instructions, parameters, and profiles 112 or receives and executes instructions, parameters, and profiles 112 responsive to a propagated signal, so that the wireless mouse 152 operatively coupled to the wireless dongle 182 may communicate wireless I/O input or data to the wireless dongle 182. The wireless dongle 182 may include a set of computer-readable instructions that may be executed via a wireless dongle microcontroller 184, for example, to cause the wireless dongle 182 to perform any one or more of the methods or computer-based functions disclosed herein. For example, computer-readable instructions may include a particular example of an I/O device wireless communication packet polling and reception system 186-2, or other aspects or components. In another example embodiment, computer-readable instructions may include a particular example of a wireless I/O protocol authentication encryption system with bi-lateral LFSR input stream 160-2, or other aspects or components.

The I/O device wireless communication packet polling and reception system 186-2, wireless I/O data signing protocol and authenticated encryption system 158-2, and the wireless I/O protocol authentication encryption system with bi-lateral LFSR input stream 160-2 may utilize a computer-readable medium such as a wireless dongle memory device 192 in which one or more sets of instructions may operate in part as firmware instructions, software instructions, or a combination executed by wireless dongle microcontroller 184 on the wireless dongle 182. The instructions may embody one or more of the methods as described herein. For example, instructions relating to the I/O device wireless communication packet polling and reception system 186-2, wireless I/O data signing protocol and authenticated encryption system 158-2, the wireless I/O protocol authenticated encryption system with bi-lateral LFSR stream 160-2, firmware or software algorithms, processes, and/or methods may be stored here. More specifically, instructions of the I/O device wireless communication packet polling and reception system 186-2, the wireless I/O data signing protocol and authenticated encryption system 158-2, the wireless I/O protocol authenticated encryption system with bi-lateral LFSR stream 160-2 may be executed by wireless dongle microcontroller 184, integrated circuit (IC), or other hardware processing resources such as an EC or the hardware processor 102 to orchestrate transmission of data packets from the wireless mouse 152 to the wireless dongle 182 during a data packet communication frames according to embodiments herein. In an example, the wireless I/O protocol authentication encryption system with bi-lateral LFSR input stream 160-2 may be executed by the wireless dongle microcontroller 184, IC, or other hardware processing resources such as an EC or the hardware processor 102 to encrypt those payloads of each data packet within a data packet communication frame sent to the wireless mouse 152 when transmitting data to the wireless mouse. Additionally, the execution of the wireless I/O protocol authentication encryption system with bi-lateral LFSR input stream 160-2 by the hardware processing resource allows the hardware processing resource to decrypt encrypted data packets received from the wireless mouse 152 at the wireless dongle 182. In other embodiments, the instructions may be executed via a controller within the integrated wireless network interface device or wireless interface adapter 128 of the information handling system 100.

The execution of the wireless I/O data signing protocol and authenticated encryption system 158-2 by the dongle microcontroller 184 also provides for the authentication from signing of the data packets, packet by packet, upon receipt from the wireless mouse 152. Still further, the execution of the wireless I/O data signing protocol and authenticated encryption system 158-2, more specifically, decrypts the encrypted data packet with a parallel generated data packet encryption value (SF) generated with a parallel first LFSR 168-2 and parallel second LFSR 170-2 generating the shifting state machine value used with an initial key or dynamic key in an AEC-ECB encryption. The data packet encryption value (SF) is applied to the received encrypted data packet in an XOR operator to yield the LFSR distributed signature and LFSR distributed payload. The execution of the wireless I/O data signing protocol and authenticated encryption agent 158-1 by the microcontroller may further cause a first LFSR 168-1 to be applied to the signature with a first tap and apply an exclusive OR (XOR) operator to the first LFSR 168-1, the signature output, and a session counter value that increases with each data packet frame to generate an LFSR distributed signature while a second LFSR 170-1 is applied to the wireless IO device input data payload with a second tap to generate an LFSR distributed payload. In an embodiment, the whitening value is also applied in the XOR to unencrypt the encrypted data packet. Then the LFSR distributed signature and LFSR distributed payload are unpacked, or descrambled, using the parallel LFSR 194-2 and fourth LFSR 196-2 to provide the signature and wireless IO device input data payload. Execution of the wireless I/O data signing protocol and authenticated encryption system 158-2 by the dongle microcontroller 184 authenticates the received signature values appended to data packet to verify that the wireless IO device input data payload has not been altered.

By authenticating the signature and authenticating the wireless IO device input data payload, a third party who accesses the transmission would be detected in the information of the signature and the wireless IO device input data payload. Additionally, if the third-party was to change the data, the wireless dongle, upon receipt and decryption of the payload and signature within the data packet will know that data has been changed based on the signature thereby allowing the wireless dongle 182 to discard the tampered data without informing the wireless mouse 152 of the data being tampered with for example. This prevents any silent third-party attacker from observing and monitoring for tampered-data notifications and attempting to find loopholes within the methods and systems described herein.

The wireless dongle memory device 192 located in and controlled by the wireless dongle microcontroller 184 may contain computer-readable medium (not shown), such as RAM in an example embodiment. An example of wireless dongle memory device 192 includes random access memory (RAM) such as static RAM (SRAM), dynamic RAM (DRAM), non-volatile RAM (NV-RAM), or the like, read only memory (ROM), another type of memory, or a combination thereof.

After an initial pairing process between the wireless dongle 182 and the wireless mouse 152, the wireless dongle microcontroller 184 may execute code instructions of the I/O device wireless communication packet polling and reception system 186-2 to orchestrate transmission of a selected number of data packets at a selected packet length from the wireless mouse 152 during one or more data packet communication frames, as described in embodiments herein. The wireless dongle memory device 192, in an embodiment, may also store one or more performance policies with wireless I/O device prioritized performance metrics for paired wireless I/O devices, and an estimated wireless I/O device data packet communication performance table for tailoring a selected number of packets and selected packet lengths transmitted by the wireless mouse 152 in a data packet communication frame.

It is appreciated that the wireless mouse 152 may also comprise similar devices and computer-readable instructions as that found within the wireless dongle 182 in order to allow either of the wireless dongle 182 and wireless mouse 152 to initiate or conduct the methods described herein. For example, the wireless mouse 152 also includes a mouse controller 172 and a wireless mouse memory device 156 used to access, store, and execute the computer-readable instructions of the I/O device wireless communication packet polling and reception agent 186-1, the wireless I/O data signing protocol and authenticated encryption agent 158-1, and the wireless I/O protocol authentication encryption system with bi-lateral LFSR input stream 160-1 stored on the wireless mouse memory device 156. The wireless mouse 152 includes a wireless mouse radio 174 that wirelessly communicates with the wireless interface adapter 128 of the information handling system 100 or the wireless dongle 182 via the wireless dongle antenna 190 and wireless dongle radio 188.

Each of the wireless I/O protocol authentication encryption system with bi-lateral LFSR input stream 160-1 of the wireless mouse 152 and the wireless I/O protocol authentication encryption system with bi-lateral LFSR input stream 160-2 of the wireless dongle 182 may be executed by their respective microcontrollers 172, 184 in order to facilitate the transmission, authentication, and encryption of the data packets within a packet communication frame of data packets transceived by each of the wireless dongle 182 and wireless mouse 152 as described in embodiments herein. The wireless I/O protocol authentication encryption system with bi-lateral LFSR input stream 160-2 and wireless I/O protocol authentication encryption agent with bi-lateral LFSR input stream 160-1 initiates a parallel process to quickly encrypt or decrypt a stream of data packets to and from the wireless mouse 152 and wireless dongle 182 during operation. In order to achieve this, the mouse microcontroller 172, for example, may execute the wireless I/O protocol authentication encryption agent with bi-lateral LFSR input stream 160-1 to generate an initial key using a key setup hash function 166-1 with a dongle nonce received from the wireless dongle 182 and a wireless device nonce received from the wireless mouse 152 as input to the key setup hash function 166-1. Similarly, the wireless I/O protocol authentication encryption system with bi-lateral LFSR input stream 160-2 may generate a same initial key using a same key setup hash function 166-2 with a dongle nonce from the wireless dongle 182 and a wireless device nonce received from the wireless mouse 152 as input to the key setup hash function 166-2.

In an embodiment, upon powering up of the wireless mouse 152, a setup phase may be initiated that allows the wireless mouse 152 and wireless dongle 182 to exchange encrypted nonce values. Each of the wireless device nonce and the dongle nonce may be generated by the mouse microcontroller 172 and wireless dongle microcontroller 184, respectively, via a random number generator. In an embodiment, the generation of the initial key during this initial key setup may include the exchange of the wireless device nonce (e.g., from the wireless mouse 152) and the dongle nonce and, at each of the wireless mouse 152 and wireless dongle 182, executing the same key setup hash function 166-1, 166-2, to generate this initial key. In an embodiment, the matching key setup hash functions 166-1, 166-2 at the wireless dongle 182 and wireless mouse 152 includes a secure hash algorithm (SHA)-256 for example. Because both the mouse microcontroller 172 and wireless dongle microcontroller 184 execute the same key setup hash function 166-1, 166-2, each of the wireless mouse 152 and wireless dongle 182 may obtain the same initial key.

The execution of the wireless I/O protocol authentication encryption system with bi-lateral LFSR input stream 160-1 and wireless I/O protocol authentication encryption agent with bi-lateral LFSR input stream 160-2 by the respective microcontrollers 172, 184 also causes the respective mouse microcontroller 172 and wireless dongle microcontroller 184 to generate a 16-byte state machine output from each of a third LFSR 194-1, 194-2 and a fourth LFSR 196-1, 196-2 using a tap sequence polynomial function 164-1, 164-2 in parallel on each side. In an embodiment, the wireless dongle 182 includes a tap sequence polynomial library 162-2 which includes one or more tap sequence polynomial functions 164-2. Similarly, the wireless mouse 152 includes a tap sequence polynomial library 162-1 which includes one or more tap sequence polynomial functions 164-1. In an embodiment, during the setup phase between the wireless dongle 182 and wireless mouse 152, encrypted data may be exchanged indicating which of the tap sequence polynomial functions 164-1, 164-2 are to be initially used by both the wireless dongle 182 and the wireless mouse 152 during the generation of the 16-byte state machine output from each of the third LFSR 194-1, 194-2 and fourth LFSR 196-1, 196-2. Additionally, third LFSR 194-2 and fourth LFSR 196-2 at the wireless dongle 182 is the same as the third LFSR 194-2 and fourth LFSR 196-2 at the wireless mouse 152. This allows for both the wireless mouse 152 and wireless dongle 182 to concurrently develop the same parallel 16-byte state machine output from the execution of the third LFSR 194-1, 194-2 and fourth LFSR 196-1, 196-2 at each step (e.g., for each packet encryption).

Concurrently, the wireless mouse microcontroller 172 may execute a wireless I/O data signing protocol and authenticated encryption agent 158-1 to cause signature data to be appended to the payload of a data packet among the selected number of data packets to be sent to the wireless dongle 182. In an embodiment, the execution of the wireless I/O data signing protocol and authenticated encryption agent 158-1 defines a length of a payload of a first data packet within the packet frame by the hardware processing device of the wireless I/O device. In an embodiment, this length may be 8 bytes, however the present specification contemplates that this length of the payload may be different than that described herein. For case of explanation, the length of the payload is selected as being 8 bytes (64 bits). After selecting the length of the payload, the execution of the wireless I/O data signing protocol and authenticated encryption agent 158-1 causes the wireless mouse microcontroller 172 to execute a modular inverse function using a selected prime number to the first data packet of the payload to generate a signature used to authenticate the first data packet when received by the wireless dongle. In an example embodiment, the 8-byte payload creates an 8-byte signature when the modular inverse function is applied to it. At this point, the payload now consists of an 8-byte payload with an 8-byte signature appended to it.

The execution of the wireless I/O data signing protocol and authenticated encryption agent 158-1 by the wireless mouse microcontroller 172 causes a first LFSR 168-1 to be applied to the signature in order to create a set of 8 bytes of pseudo-random bytes to scramble the signature bytes for an LFSR distributed signature. In an embodiment, similar to the third LFSR 194-1, 194-2 and fourth LFSR 196-1, 196-2 described herein, the first LFSR 168-1 uses a tap sequence polynomial 164-1 that may be different to create these pseudo-random bytes of the LFSR distributed signature. The tap sequence polynomial function 164-1 may be the same tap sequence polynomial function 164-1 used with the operation of the third LFSR 194-1, 194-2 and fourth LFSR 196-1, 196-2 described herein or may be a different tap sequence polynomial function 164-1 maintained in the tap sequence polynomial library 162-1 on the wireless mouse memory device 156. In an embodiment, the identification of the which tap sequence polynomial function 164-1 is being used may be relayed to the wireless dongle 182 during the setup phase.

The execution of the wireless I/O data signing protocol and authenticated encryption agent 158-1 by the wireless mouse microcontroller 172 further causes a second LFSR 170-1 to be applied to the wireless IO device input data payload with a second tap to scramble the wireless IO device input data payload and generate an LFSR distributed payload. Application of the second LFSR 170-1 to the payload also creates pseudo-random bytes of the payload. Again, during the execution of the second LFSR 170-1, a tap sequence polynomial 164-1 may be used with the second LFSR 170-1 to create these pseudo-random bytes of the payload. The tap sequence polynomial function 164-1, in an example embodiment, is different than that tap sequence polynomial function 164-1 used with the operation of the first LFSR 168-1 or the third LFSR 194-1, 194-2 and fourth LFSR 196-1, 196-2 and is also maintained in the tap sequence polynomial library 162-1 on the wireless mouse memory device 156. The differentiation between the tap sequence polynomial function 164-1 used for the first LFSR 168-1 and the second LFSR 170-1 ensures that there is no convergent by trial-and-error LFSR function execution thereby preventing a third-party from detecting similar output from the encryption between to data packets and reversing the processes described herein. In an embodiment, the identification of the which tap sequence polynomial function 164-1 is being used may be previously relayed to the wireless dongle 182 during the setup phase. In another embodiment, which tap sequence polynomial function 164-1 being used to encrypt the data packets of a next data packet frame may be defined using the dynamic key output from the first, previously-encrypted data packet as an index that points to which tap sequence polynomial function 164-1 within the tap sequence polynomial library 162-1, 162-2 to use for the encryption of this next data packet frame. For example, the last 2 bytes of the dynamic key used to encrypt a first data packet of a first data packet frame may be used to point to which tap sequence polynomial function 164-1 within the tap sequence polynomial library 162-1, 162-2 to use for the LFSR shift during the encryption of this next data packet frame. In this example, a prime number may be within range of the tap sequence polynomial library 162-1, 162-2 and, assuming the tap sequence polynomial library 162-1, 162-2 has a list of tap sequence polynomial functions 164-1 that meets or exceeds 126 polynomial functions, the prime number may be used to point to the next tap sequence polynomial function 164-1 to be used, for example in pseudocode, index=dkeylast2 bytes Mod 127.

The execution of the wireless I/O data signing protocol and authenticated encryption agent 158-1 may also inform the mouse microcontroller 172 that these processes are done so that the mouse microcontroller 172 can execute the wireless I/O protocol authenticated encryption agent with bi-lateral LFSR stream 160-1 as described herein. In an embodiment, prior to the encryption of the data packet (e.g., comprising the LFSR distributed signature and LFSR distributed payload), a whitening process may be conducted to further add security to the data to promote anti-tampering of that data as it is being transmitted to the wireless dongle 182. In an embodiment, the whitening of the data packet may include an XOR processes that creates this masking process of the data in the data packet. In an embodiment, the whitening process may include an XOR operation a whitening function output with the LFSR distributed signature and LFSR distributed payload and the generated data packet encryption output value (SF) from the AES-ECB encryption on a packet by packet. In one example embodiment, the parallel whitening function may include using output of a fifth parallel LFSR 198-1, 198-2 at the wireless mouse and wireless dongle respectively. The whitening steps described herein may be used to eliminate a single layer XOR encryption scheme thereby adding security steps to the systems and methods described herein.

The execution of the wireless I/O protocol authentication encryption agent with bi-lateral LFSR input stream 160-1 by the mouse microcontroller 172 causes the data packets being sent within the packet communication frame from either of the wireless mouse 152 or wireless dongle 182 to be encrypted after the wireless I/O data signing protocol and authenticated encryption agent has been executed and the payload has been appended with the signature as described herein. As described herein, the polling request from the wireless dongle 182 may have indicated that a selected number of data packets of a selected length and at specified time slots. In an example embodiment, the selected number of data packets may be 5 data packets. In an example embodiment, the selected length of the data packet requested may be 16 bytes. As described herein, the execution of the wireless I/O data signing protocol and authenticated encryption agent 158-1 may define 8 bytes that are to be matched up with another 8 bytes of a signature during the execution of the modular inverse function. This creates a 16-byte data packet that can be encrypted by execution of the wireless I/O protocol authenticated encryption agent with bi-lateral LFSR stream 160-1 by the mouse microcontroller 172 as described in the embodiments herein.

In an embodiment, the execution of the I/O device wireless communication packet polling and reception agent 186-1 with the wireless I/O protocol authentication encryption agent with bi-lateral LFSR input stream 160-1 and I/O device wireless communication packet polling and reception system 186-2 and wireless I/O protocol authentication encryption agent with bi-lateral LFSR input stream 160-2 causes each of the mouse microcontroller 172 and wireless dongle microcontroller 184, respectively, to execute an encryption algorithm (when transmitting data) using the initial key and 16-byte state machine output from each of a third LFSR 194-1, 194-2 and a fourth LFSR 196-1, 196-2 as parameters to provide first data packet encryption output value (SF). This first data packet encryption output value is used to encrypt or decrypt a first packet among the number of packets in a first round of encryption for a data packet communication frame or a stream of packets. In an embodiment, the encryption algorithm may include an advanced encryption standard-electronic codebook (AES-ECB) with the initial key and 16-byte state machine output from each of third LFSR 194-1, 194-2 and fourth LFSR 196-1. 196-2 as parameters to generate the first data packet encryption output value (SF) to encrypt a first packet via an XOR operator with the LFSR distributed signature and LFSR distributed payload among the number of packets in the packet communication frame of data packets. It is appreciated that the XOR processes associated with the whitening process and the encryption of the first data packet may be conducted in any order with the order being known to both the wireless mouse microcontroller 172 and the wireless dongle microcontroller 184. Decryption occurs in reverse with a parallel initial or dynamic key, LFSR shifting state machine values (e.g., from the first LFSR 168-1, 168-2, the second LFSR 170-1, 170-2, the third LFSR 194-1, 194-2, and the fourth LFSR 196-1, 196-2) and the like with XOR operators to yield the unencrypted data packets and signature for authentication of the data.

The execution of the wireless I/O protocol authentication encryption agent with bi-lateral LFSR input stream 160-1 and wireless I/O protocol authentication encryption system with bi-lateral LFSR input stream 160-2 by the mouse microcontroller 172 and wireless dongle microcontroller 184, respectively, causes the execution of the encryption algorithm, using the first data packet encryption output as a subsequent dynamic key and a shifted 16-byte state machine output from each of the parallel third LFSRs 194-1, 194-2 and parallel fourth LFSRs 196-1, 196-2 as the parameters, to generate a data packet encryption output value (SF) used with an XOR operator encrypt a second packet in an LFSR distributed signature and LFSR distributed payload among the number of packets in the packet communication frame. In an embodiment, therefore, the data packet encryption output value (SF) used to encrypt a previously encrypted packet among the plurality of data packets sent within the packet communication frame is used as one of the parameters in the AES-ECB to generate a next data packet encryption output value to encrypt a subsequent data packet via an XOR operator with the LFSR distributed signature and LFSR distributed payload and any whitening output value in that packet communication frame.

Because the data packet encryption output from the previously encrypted packet and the shifted 16-byte state machine output from the third LFSR 194-1, 194-2 and fourth LESR 196-1, 196-2 are used as parameters in an AES-ECB encryption to generate a next data packet encryption output to encrypt a subsequent packet, the immunity to an attack from a third party via, for example, a brute force operation is improved substantially, for example, approximately $2^{128}$ better, than would have been otherwise using just the AES encryption for each packet. Additionally, because the encryption method implements two LFSRs (e.g., the third LFSR 194-1, 194-2 and fourth LFSR 196-1, 196-2) in parallel for each encryption or decryption of each data packet, the ability for a third party to obtain all of the encrypted data packets in order to reverse the encryption method is hindered due to the time and number of encrypted packets necessary to complete and reverse that encryption. Further, the operation of the third LFSR 194-1, 194-2 and fourth LFSR 196-1, 196-2 in parallel are lower energy and require less computer ability than use of a hash function, for example. Indeed, it is anticipated that a user of the wireless mouse 152 may not cycle through the possible encrypted data packets within a set time before the wireless mouse 152 goes into a sleeping mode or is turned off, for example, thereby resetting the start state of the first LFSR 168-1, 168-2, the second LFSR 170-1, 170-2, the third LFSR 194-1, 194-2, and the fourth LFSR 196-1, 196-2. However, the decryption of these data packets may be relatively quick by the wireless dongle 182 or wireless mouse 152 (depending on which device is transmitting and which is receiving) due to the initial key being known (e.g., the device nonce, wireless dongle nonce, and key setup hash function 166-1, 166-2 being known by the wireless mouse 152 and the wireless dongle 182), the parallel implemented tap sequence polynomial functions 164-1, 164-2 used in the processes described herein being known by the wireless mouse 152 and wireless dongle 182, and the number of packets being known to be received within the packet communication frame. This increases security of the data being transceived between the wireless I/O device (e.g., the wireless mouse 152 in this example) and the wireless dongle 182 while still allowing for quick transmission of data packets in a packet communication frame as described herein.

It is appreciated that the wireless dongle 182, with the wireless dongle microcontroller 184, may execute the I/O device wireless communication packet polling and reception system 186-2, the wireless I/O data signing protocol and authenticated encryption system 158-2, and the wireless I/O protocol authenticated encryption system with bi-lateral LFSR stream 160-2 with similar results when transmitting data to a wireless I/O device such as the wireless mouse 152 from a wireless dongle 182 described herein. Thus, the present specification contemplates that the systems and methods described herein may be completed by a wireless I/O device or the wireless dongle 182.

Figure 2:
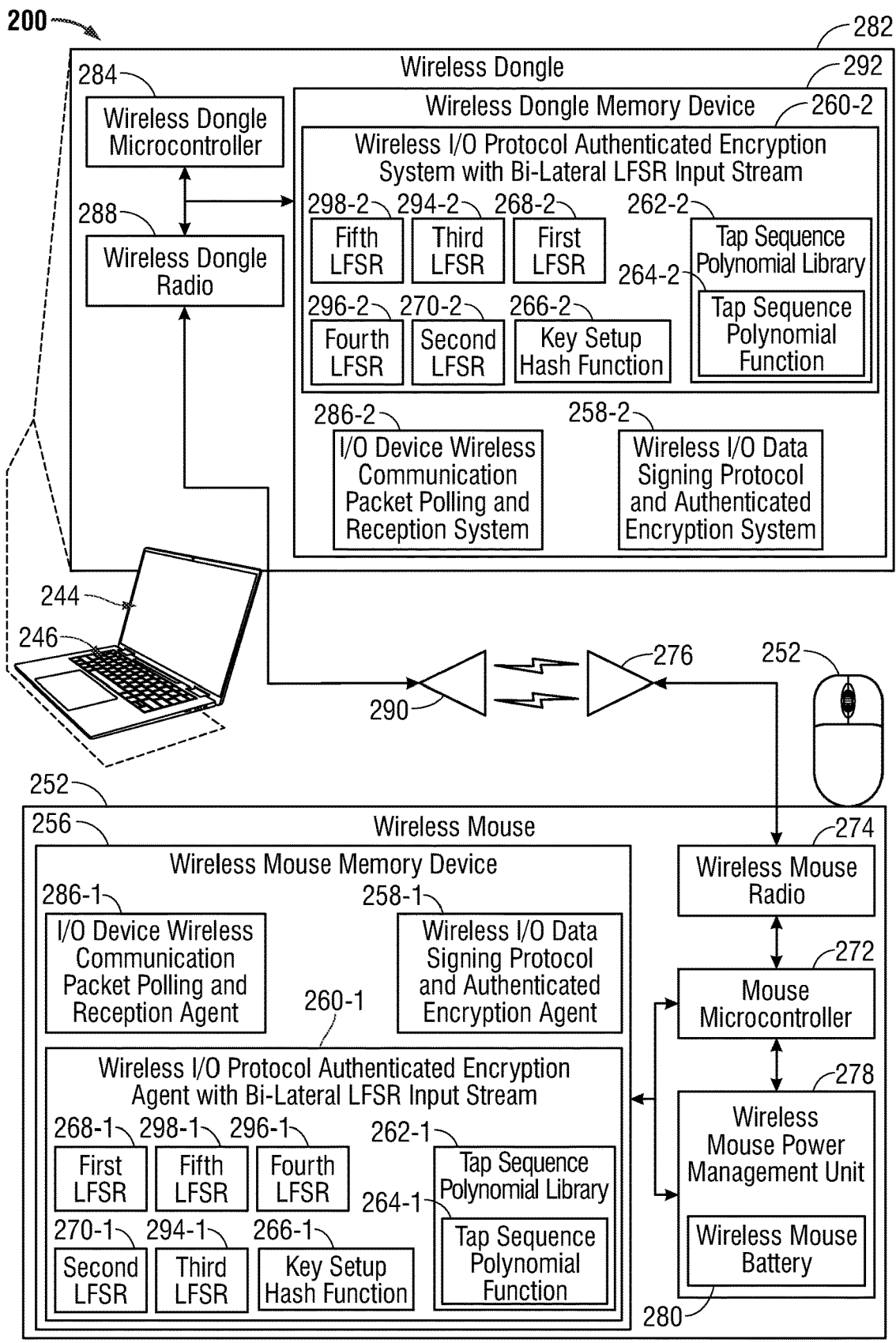
FIG. 2 is a graphic diagram of an information handling system including a wireless dongle and a wirelessly-coupled wireless I/O device that each execute code instructions of a wireless I/O data signing protocol and authenticated encryption system or agent to securely transmit data between the wireless I/O device and wireless dongle according to an embodiment of the present disclosure.

FIG. 2 is a graphic diagram of an information handling system 200 including a wireless dongle 282 and an wirelessly-coupled wireless I/O device such as the wireless mouse 252 that each comprise a wireless input/output (I/O) protocol authenticated encryption agent or system with bi-lateral linear-feedback shift register (LFSR) input stream 260-1, 260-2 respectively executable by a microcontroller unit at the wireless dongle 282 the information handling system and a mouse microcontroller 272 within the wireless mouse 252 to securely transmit data packets to and from the wireless I/O device (e.g., the wireless mouse 252) and wireless dongle 282 according to an embodiment of the present disclosure.

It is appreciated that, instead of a wireless dongle 282 being inserted into a universal serial bus (USB) of the information handling system in order to wirelessly couple the information handling system 200 to the wireless mouse 252, the information handling system 200 may include a wireless interface adapter with hardware processing resource to wirelessly couple the information handling system 200 to the wireless mouse 252. It is also appreciated that the wireless dongle 282 may be wirelessly coupled to any wireless I/O device of which the wireless mouse 252 is one example. Thus, although the present specification describes the wireless I/O device or wireless I/O device as being a wireless mouse 252, the present specification contemplates that other wireless I/O devices such as a wireless keyboard, trackpad, stylus, gaming controller or the like may be operatively and wirelessly coupled to the wireless dongle 282 or wireless interface adapter described herein.

As described herein, the wireless coupling of the information handling system 200 to the wireless I/O device may be accomplished, in one embodiment, via operation of the wireless interface adapter (not shown), radio (not shown), and RF front end (not shown) to communicate with any wireless I/O device via a BLE 2.4 GHz band. In another embodiment, the wireless coupling of the information handling system 200 to the wireless I/O device may be accomplished, in one embodiment, via operation of a wireless dongle radio 288 and wireless dongle antenna 290 to communicate with any wireless I/O device such as the wireless mouse 252 via a BLE 2.4 GHz band. Therefore, the wireless communication may be conducted using an internal wireless communication system within the information handling system 200 or via a wireless dongle 282 operatively coupled to the information handling system 200 via a USB port or other wired connection. It is further appreciated that any wireless I/O device or wireless I/O device 242 may provide input and receive output to and from the information handling system 200. For ease of description, the present specification will describe the wireless mouse 252 operatively and wirelessly coupled to a wireless dongle 282 in order to encrypt, send and receive data packets in a data packet communication frame to and from the information handling system.

As described herein, the information handling system 200 in an embodiment is operably coupled to the wireless dongle 282. In an embodiment, the wireless dongle microcontroller 284 at the wireless dongle 282 and/or the mouse microcontroller 272 may orchestrate scheduled delivery of a selected number of data packets from any number of wireless I/O devices, such as the wireless mouse 252, during scheduled data packet communication frames via execution of the I/O device wireless communication packet polling and reception system 286-2 according to various embodiments of the present disclosure. The wireless dongle 282 or integrated wireless radio adapter of the information handling system 200 in an embodiment may house a wireless dongle microcontroller 284 executing firmware instructions of an I/O device wireless communication packet polling and reception system 286-2 in an embodiment. The wireless dongle 282 may be a dongle in one embodiment that is operatively coupled to the information handling system 200 through insertion of the wireless dongle 282 within a USB port of the information handling system 200, for example. In another embodiment, the wireless dongle 282 may be incorporated within the housing of the information handling system 200 as part of an integrated wireless radio adapter and operatively coupled to a bus of the information handling system 200 through one of several means for transmitting data, including connection through a USB hub, a Thunderbolt hub, or any other type of data transfer hub.

The wireless dongle 282 and its wireless dongle radio 288 and wireless dongle antenna 290 or may transmit and receive information necessary to pair the wireless mouse 252 with the information handling system 200, such as, for example, pairing or wireless communication profiles for pairing the information handling system 200 and the wireless mouse 252 or other wireless I/O device. In an embodiment, the wireless mouse 252 with its wireless mouse radio 274 and wireless mouse antenna 276 may initiate this pairing process instead of the wireless dongle 282. Therefore, the present specification contemplates that an initial pairing process may be initiated either by the wireless dongle 282 or the wireless mouse 252. Such pairing or wireless communication profiles may operate to identify the wireless mouse 252 as a device authorized to transceive data with the information handling system 200 and/or the wireless dongle 282 under the paired wireless protocol, as well as information sufficient to identify the wireless mouse 252, such as a Media Access Control (MAC) address, IP address, or model number, among other identifying data.

The I/O device wireless communication packet polling and reception system 286-2, wireless input/output (I/O) protocol authenticated encryption system with bi-lateral linear-feedback shift register (LFSR) input stream 260-2, and wireless input/output (I/O) data signing protocol and authenticated encryption system 258-2 may all be code instructions that are stored and utilize a computer-readable medium such as a wireless dongle memory device 292 in which one or more sets of instructions may operate in part as firmware instructions, software instructions, or a combination executed by wireless dongle microcontroller 284 on the wireless dongle 282. Additionally, the I/O device wireless communication packet polling and reception agent 286-1, wireless input/output (I/O) protocol authenticated encryption agent with bi-lateral linear-feedback shift register (LFSR) input stream 260-1, and wireless input/output (I/O) data signing protocol and authenticated encryption agent 258-1 may all be code instructions that are stored and may utilize a computer-readable medium such as a wireless mouse memory device 256 in which one or more sets of instructions may operate in part as firmware instructions, software instructions, or a combination executed by wireless mouse microcontroller 272 on the wireless mouse 252. These instructions may embody one or more of the methods for signing and encryption or authentication and decryption as described herein for transmission and reception of encrypted data packets via the wireless mouse radio 274 or wireless dongle radio 288.

The I/O device wireless communication packet polling and reception system 286-2, wireless input/output (I/O) protocol authenticated encryption system with bi-lateral linear-feedback shift register (LFSR) input stream 260-2, and wireless input/output (I/O) data signing protocol and authenticated encryption system 258-2 execute as code instructions via the wireless dongle microcontroller 284 and variously implement the key setup hash function 266-2, tap sequence polynomial 264-2 of a tap sequence polynomial library 262-2, and the first LFSR 268-2, second LFSR 270-2, third LFSR 294-2, fourth LFSR 296-2, and fifth LFSR 298-2. Such elements are implemented according to various embodiments of the present disclosures and detailed herein for encryption or decryption of wireless IO device data packets received via a data packet communication frame between the wireless IO device, such as wireless mouse 252 and a wireless dongle 282 for communication with information handling system 200.

Similarly, the I/O device wireless communication packet polling and reception agent 286-1, wireless input/output (I/O) protocol authenticated encryption agent with bi-lateral linear-feedback shift register (LFSR) input stream 260-1, and wireless input/output (I/O) data signing protocol and authenticated encryption agent 258-1 execute as code instructions via the wireless mouse microcontroller 272 and variously implement the key setup hash function 266-1, tap sequence polynomial 264-1 of tap sequence polynomial library 262-1, and the parallel counter parts of the first LFSR 268-1, second LFSR 270-1, third LFSR 294-1, fourth LFSR 296-1, and fifth LFSR 298-1. Such elements are implemented according to various embodiments of the present disclosures and detailed herein for decryption or encryption of wireless IO device data packets transmitted via a data packet communication frame between the wireless IO device, such as wireless mouse 252, and a wireless dongle 282 for communication with information handling system 200.

The wireless dongle memory device 292 located in and controlled by the wireless dongle microcontroller 284 may contain computer-readable medium (not shown), such as RAM in an example embodiment. An example of wireless dongle memory device 292 includes random access memory (RAM) such as static RAM (SRAM), dynamic RAM (DRAM), non-volatile RAM (NV-RAM), or the like, read only memory (ROM), another type of memory, or a combination thereof. After an initial pairing process between the wireless dongle 282 and the wireless mouse 252, the wireless dongle microcontroller 284 may execute code instructions of the I/O device wireless communication packet polling and reception system 286-2 to orchestrate transmission of a plurality of data packets from the wireless mouse 252 during one or more data packet communication frames, as described in embodiments herein. The wireless dongle memory device 292, in an embodiment, may also store one or more performance policies with wireless I/O device prioritized performance metrics for paired wireless I/O devices, and an estimated wireless I/O device data packet communication performance table for tailoring and selecting a selected number of packets of selected packet lengths transmitted by the wireless mouse 252 within an expected time frame.

It is appreciated that the wireless mouse 252 may also comprise similar devices and computer-readable instructions as that found within the wireless dongle 282 in order to allow either of the wireless dongle 282 and wireless mouse 252 to initiate or conduct the methods described herein. For example, the wireless mouse 252 also includes a mouse controller 272 and a wireless mouse memory device 256 used to access, store, and execute the computer-readable instructions of the I/O device wireless communication packet polling and reception agent 286-1 stored on the wireless mouse memory device 256. The wireless mouse 252 includes a wireless mouse radio 274 that wirelessly communicates with the wireless interface adapter 228 of the information handling system 200 or the wireless dongle 288 via the wireless dongle antenna 290.

Figure 3:
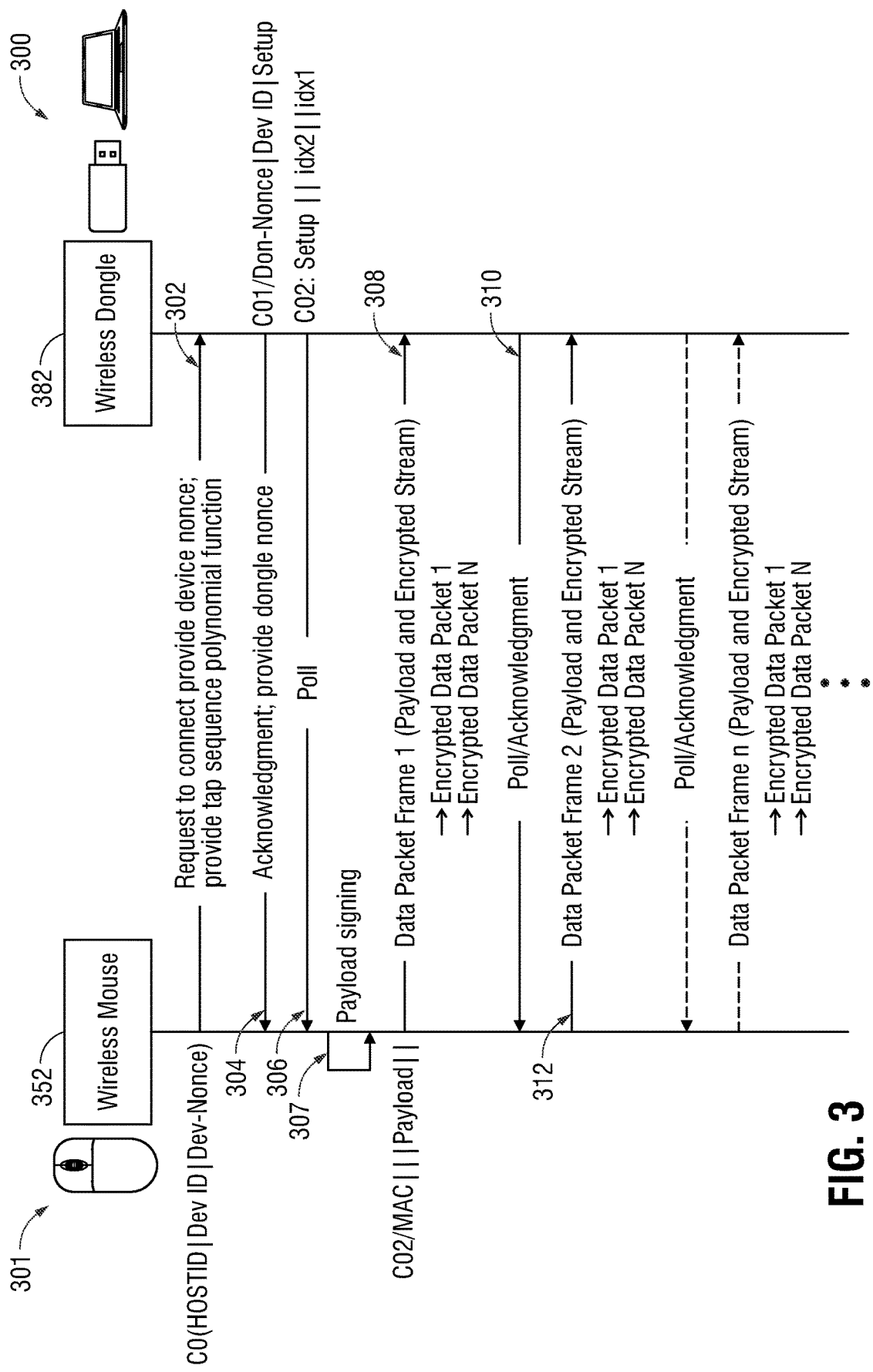
FIG. 3 is a process flow diagram of a method of signing and encrypting a packet data stream between a wireless I/O device and a wireless dongle with a wireless I/O data signing protocol and authenticated encryption agent during orchestration a polling packet and responsive data packet communication frame according to an embodiment of the present disclosure.

FIG. 3 is a process flow diagram of a method 301 of encrypting a packet data stream as in a data packet communication frame between a wireless I/O device 352 and a wireless dongle 382 according to an embodiment of the present disclosure. As described herein, the wireless dongle 382 may be operatively coupled to an information handling system 300 via, for example, a USB port and therefore operatively coupled to a hardware processing device of the information handling system 300. In an alternative embodiment, the information handling system 300 may include a wireless interface adapter (e.g., FIG. 1, 128) that communicates with the wireless mouse 352 or other wireless I/O device using the systems and methods described herein. Again, it is appreciated that although FIG. 3 shows a wireless mouse 352 communicatively coupled to the wireless dongle 382, the present specification contemplates that other wireless I/O devices may be operatively coupled to the wireless dongle and operate the systems and methods described herein in order to securely transmit data to and from the wireless I/O device. Other wireless I/O devices may include, for example, a keyboard, a stylus, a headset, an external video display device, a trackpad, a virtual reality headset, a gaming controller, a microphone, and any other wireless I/O device.

In an embodiment, the wireless communication between the wireless mouse 352 may begin when the wireless mouse 352 is turned on or the wireless dongle 382 is inserted into the USB port of the information handling system 300. A wireless setup process may be conducted in order to coordinate the encryption and decryption parameters used to encrypt and decrypt a selected number of data packets within a data packet communication frame (e.g., 5 data packets) that are transmitted from the wireless mouse 352 to the wireless dongle 382 and from the wireless dongle 382 to the wireless mouse 352 pursuant to the wireless I/O device communication protocol of embodiments herein. FIG. 3 describes the encryption and transmission of these data packets within the data packet communication frame from the wireless mouse 352 to the wireless dongle 382. However, it is appreciated that the systems and methods described herein is applicable to those data packet transmissions from the wireless dongle 382 to the wireless mouse 352 as well. It is further appreciated that a decryption process may be conducted at the wireless dongle 382 using a reverse process as that used to encrypt the data packets with a parallel key and LFSR state machine values to restore the sent data packet and unscramble distributed values.

At line 302, the wireless mouse 352 sends a request to connect wirelessly with the wireless dongle 382. This request may include data describing how data packets are going to be encrypted by the wireless mouse 352 and, consequently, how the wireless dongle 382 can decrypt the packets as they are streaming into the wireless dongle 382. In an example embodiment, the wireless mouse 352 may send a wireless I/O device nonce. The wireless I/O device nonce may include any random number generated by, for example, a random number generator. As described herein, this wireless I/O device nonce may be part of the data used by both the wireless mouse 352 and wireless dongle 382 to create an initial key used to encrypt (and later decrypt) the data packets within a packet communication frame sent from the wireless mouse 352 to the wireless dongle 382. In an example embodiment, the data sent from the wireless mouse 352 to the wireless dongle 382 may further include an indication of one or more tap sequence polynomial functions (e.g., located within a tap sequence polynomial function library maintained on the wireless mouse 352 and wireless dongle 382 individually) being used to define the tap sequences used with the first linear-feedback shift register and the second linear-feedback shift register described herein. Other data may be included with this setup data sent from the wireless mouse 352 to the wireless dongle 382 including, for example, data identifying the host identity (e.g., HostID) and data identifying the device identity (e.g., DevID). This data may be encrypted using, for example, the AES-ECB encryption function to secure the data being transmitted. In an embodiment, a message authentication code (MAC) may be included with this transmission that can indicate to the wireless dongle 382 whether the data was manipulated or accessed by a third party. If the MAC indicates that this setup data has been accessed or manipulated by a third party, the wireless dongle 382 may send a transmission to the wireless mouse 352 indicating as such and requesting new data such as an indication of a new tap sequence polynomial function to be used and a new device nonce.

At line 304, the method 301 may continue with an acknowledgement from the wireless dongle 382 indicating that the wireless dongle 382 has received the data, intact and unaltered. This acknowledgment transmission may also include other data used to complete the setup process between the wireless mouse 352 and wireless dongle 382 in order to engage in the encryption and decryption processes of the data packets within the data packet communication frames as described herein. For example, the additional data may include a dongle nonce. The dongle nonce, similar to the wireless I/O device nonce, may be generated by a microcontroller at the wireless dongle 382 executing a random number generator. Thus, the wireless dongle 382 and wireless mouse 352 both have the wireless I/O device nonce and dongle nonce and may use this data to generate an initial key used to encrypt and decrypt in a first round the first wireless IO device input data packets within each data packet communication frame sent from the wireless mouse 352 to the wireless dongle 382 or from the wireless dongle 382 to the wireless mouse 352 in some embodiments. The setup data from the wireless dongle 382 may also include the identification data associated with the wireless dongle 382 in order to confirm that the wireless dongle 382 is authorized to communicate with the wireless mouse 352.

At line 306, the wireless dongle 382 may poll the wireless mouse 352 via a polling packet. This polling packet may include an indication of how many data packets within a given data packet communication frame that are selected to be sent from the wireless mouse 352 to the wireless dongle 382. For example, this polling packet may provide the wireless mouse 352 with an instruction of the selected number of data packets expected to be received (e.g., 5 data packets) within any given data packet communication frame and data packet lengths as well as the expected time frame in which these selected number of data packets and the entire data packet communication frame is to be received at the wireless dongle 382. It is appreciated as well that this polling packet 306 may be sent to the wireless mouse 352 if and when the selected number of data packets to be expected to be received by the wireless dongle 382 changes due to, for example, processing abilities of the wireless dongle microcontroller, processing capabilities or processing resource availability of the hardware processor of the information handling system 300, and any detected data packet transmission failures, if any, detected at the wireless dongle 382, among other factors.

At this point at line 306, each of the microcontroller at the wireless mouse 352 and the microcontroller at the wireless dongle 382 may execute a key setup hash function to derive an initial key used to encrypt a first data packet within the data packet communication frame. This initial key is used as part of the encryption data and decryption data used to encrypt and decrypt the data packets by the wireless mouse 352 and wireless dongle 382 as described herein.

As described herein, prior to any encryption being conducted on any data packet, the wireless mouse microcontroller, at line 307, may execute computer-readable program code of a wireless I/O data signing protocol and authenticated encryption agent in order to generate a signature to be associated with each data packet prior to transmission. Again, the wireless mouse microcontroller may execute a wireless I/O data signing protocol and authenticated encryption agent to cause signature data to be appended to the payload of a data packet among the selected number of data packets to be sent to the wireless dongle 382. In an embodiment, the execution of the wireless I/O data signing protocol and authenticated encryption agent define a length of a payload of a first data packet within the packet frame by the hardware processing device of the wireless I/O device. In an embodiment, this length may be 8 bytes, however the present specification contemplates that this length of the payload may be different than that described herein. For ease of explanation, the length of the payload is selected as being 8 bytes (64 bits). After selecting the length of the payload, the execution of the wireless I/O data signing protocol and authenticated encryption agent causes the wireless mouse microcontroller to execute a modular inverse function using a selected prime number to the first data packet of the payload to generate a signature used to authenticate the first data packet when received by the wireless dongle. In an example embodiment, the 8-byte payload creates an 8-byte signature when the modular inverse function is applied to it. At this point, the payload now consists of an 8-byte payload with an 8-byte signature appended to it.

The execution of the wireless I/O data signing protocol and authenticated encryption agent by the wireless mouse microcontroller causes a first LFSR to be applied to the signature in order to create a set of 8 bytes of pseudo-random bytes for an LFSR distributed signature. In an embodiment, similar to the third LFSR and fourth LFSR described herein, the first LFSR uses a tap sequence polynomial with the first LFSR 168-1 to create these pseudo-random bytes of the LFSR distributed signature. The tap sequence polynomial function may be the same tap sequence polynomial function used with the operation of the third LFSR and fourth LFSR described herein or may be a different tap sequence polynomial function maintained in the tap sequence polynomial library on the wireless mouse memory device. In an embodiment, the identification of the which tap sequence polynomial function is being used may be relayed to the wireless dongle during the setup phase.

The execution of the wireless I/O data signing protocol and authenticated encryption agent by the wireless mouse microcontroller further causes a second LFSR to be applied to the wireless I/O device input data payload with a second tap to generate an LFSR distributed payload. Application of the second LFSR to the payload also creates pseudo-random bytes of the LFSR distributed payload. Again, during the execution of the second LFSR, a tap sequence polynomial may be used with the second LFSR to create these pseudo-random bytes of the LFSR distributed payload. The tap sequence polynomial function, in an example embodiment, is different than that tap sequence polynomial function used with the operation of the first LFSR or the third LFSR and fourth LFSR and is also maintained in the tap sequence polynomial library on the wireless mouse memory device. The differentiation between the tap sequence polynomial function used for the first LFSR and the second LFSR ensures that there is no convergent by trial-and-error LFSR function execution thereby preventing a third-party from detecting similar output from the encryption between to data packets and reversing the processes described herein. In an embodiment, the identification of the which tap sequence polynomial function is being used may be previously relayed to the wireless dongle 382 during the setup phase.

The execution of the wireless I/O data signing protocol and authenticated encryption agent may also inform the mouse microcontroller that these processes are done so that the mouse microcontroller can execute the wireless I/O protocol authenticated encryption agent with bi-lateral LFSR stream as described herein. In an embodiment, prior to the encryption of the data packet (e.g., comprising the signature and LFSR distributed payload), a whitening process may be conducted to further add security to the data to promote anti-tampering of that data as it is being transmitted to the wireless dongle 382. In an embodiment, the whitening of the data packet may be included in an XOR processes that creates this masking process of the data in the data packet. In an embodiment, the whitening process may include an XOR operation with a whitening function output such as output of a fifth LFSR on the LFSR distributed signature and LFSR distributed wireless I/O device input data packet and the encryption generated data packet encryption output value (SF). This XOR function with or without the whitening process may result in an encrypted data packet and the encryption generated data packet encryption output value (SF) may operate as a dynamic key for a next data packet encryption according to embodiments herein. The encryption generated data packet encryption output value (SF) results from application of an AES-ECB encryption function to the initial or dynamic key and a shifting state machine value from a third shifting LFSR and a fourth shifting LFSR according to embodiments herein.

At line 308, the wireless mouse 352, after having acknowledged the transmission from the wireless dongle 382 of the polling, may begin the transmission of the selected number of data packets within the data packet communication frame thereby creating an encrypted stream (ES) being transmitted, in the example embodiment shown in FIG. 3, from the wireless mouse 352 to the wireless dongle 382. At this point, the execution of the wireless I/O protocol authentication encryption agent with bi-lateral LFSR input stream and I/O device wireless communication packet polling and reception agent (e.g., FIG. 1, 160-1, 186-1) by the wireless mouse microcontroller and the wireless I/O protocol authentication encryption system with bi-lateral LFSR input stream and I/O device wireless communication packet polling and reception system (e.g., FIG. 1, 160-2, 186-2) wireless dongle microcontroller causes these data packets within the data packet communication frame being sent from either of the wireless mouse 352 or wireless dongle 382 to be encrypted data packet by data packet. In an embodiment, the execution of the I/O device wireless communication packet polling and reception agent at the wireless mouse 352 causes the wireless mouse microcontroller to execute an encryption algorithm using the initial key and a 16-byte state machine output from each of a first LFSR (e.g., FIG. 1 168-1) and a second LFSR (e.g., FIG. 1, 170-1) as parameters to provide first data packet encryption output (SF) to encrypt, with the XOR operation, a first packet among the number of packets (e.g., 5 packets) within the data packet communication frame and. In an embodiment, the encryption algorithm may include an AES-ECB with the initial key and 16-byte state machine output from each of a first LFSR and a second LFSR to generate the encryption generated data packet encryption output value (SF) which is used as an XOR operation input parameters with the LFSR distributed signature and LFSR distributed wireless I/O device input data payload to encrypt a first packet among the selected number of packets of the data packet communication frame.

The execution of the I/O device wireless communication packet polling and reception agent by the mouse microcontroller 172 causes the execution of the encryption algorithm, using the first data packet encryption output as a next key and output from each of the first LFSR and second LFSR (e.g., 16-byte state machine output) as the parameters, to encrypt a second packet among the selected number of packets in the data packet communication frame using an encryption algorithm such as the EAS-ECB encryption algorithm. Again, because each of the wireless mouse 352 and wireless dongle 382 have negotiated the taps to be used for each of the first LFSR and second LFSR using the tap sequence polynomial function, the eventual decryption of these data packets at the wireless dongle 382 may be completed by reversing the encryption process using the 16-byte state machine output from the first LFSR and second LFSR at the wireless dongle 382 as well as the parallel key (either the initial key or the output from the encryption of a prior data packet) at the wireless dongle 382. In an embodiment, therefore, the data packet encryption output value used to encrypt a previously encrypted packet among the plurality of data packets sent within the packet communication frame is used as a dynamic key and one of the parameters in an AES-ECB to generate a next data packet encryption output value to encrypt a next data packet via an XOR operator in that packet communication frame.

The method 301 further includes repeating the processes, similar to those described in lines 306 and 308, any number of times, such as at lines 310 and 312, until the wireless mouse 352 is either turned off or data is no longer transmitted between the wireless mouse 352 and wireless dongle 382. For example, line 310 may describe a polling from the wireless dongle 382 indicating a selected number of data packet transmissions of a second data packet communication frame. The wireless mouse 352, in response to the polling at line 310, again proceeds with the encryption of a first data packet within this next data packet communication frame to be sent to the wireless dongle 382. However, the first data packet within this next data packet communication frame is encrypted, at line 312, using the output from the last data packet in the data packet communication frame sent previously by the wireless mouse 352. As such, the encryption of the data packets within any data packet communication frame is still dependent on the output from a previously encrypted data packet without any limitation to what data packet communication frame these data packets are sent within. In an embodiment, the wireless mouse 352 and wireless dongle 382 may maintain a session counter indicating at each of the wireless mouse 352 and wireless dongle 382 the number of packets that have been sent and which data packet is being encrypted and decrypted at the respective devices (e.g., encrypted at the wireless mouse 352 and decrypted at the wireless dongle 382).

Again, because each of the wireless mouse 352 and wireless dongle 382 include a session counter, the number of packets being transmitted between the wireless mouse 352 and wireless dongle 382 is known based on the number of packets that have been encrypted and decrypted thereby allowing each device, independently, to know which output from which data packet was used to encrypt a current data packet being received. This allows each of the wireless mouse 352 and wireless dongle 382 to properly decrypt the data being transmitted thereby allowing each to communicate securely using the encryption methods and systems described herein.

The method 301 may end when data is no longer being transmitted due to, for example, the wireless mouse 352 being turned off or the information handling system 300 being turned off such that data is no longer being received or sent. It is also appreciated that when the wireless mouse 352 and information handling system 300/wireless dongle 382 are turned back on, the setup processes described at lines 302 and 304 may be initiated again thereby resulting in the creation of a new dongle nonce, a new device nonce, the selection of a new tap sequence polynomial function, and the generation of the a new initial key used to encrypt the first data packet with the data packet communication frame initially sent by the wireless mouse 352 (or wireless dongle 382). In an embodiment, this setup process described at lines 302 and 304 may be reinitiated after a predetermined period of time of inactivity from the wireless mouse 352. In yet another embodiment, the setup processes described in connection with lines 302 and 304 may be repeated after a predetermined passage of time (e.g., after 10 minutes of use) such that a third party may not be capable of reversing the encryption process.

Figure 4:
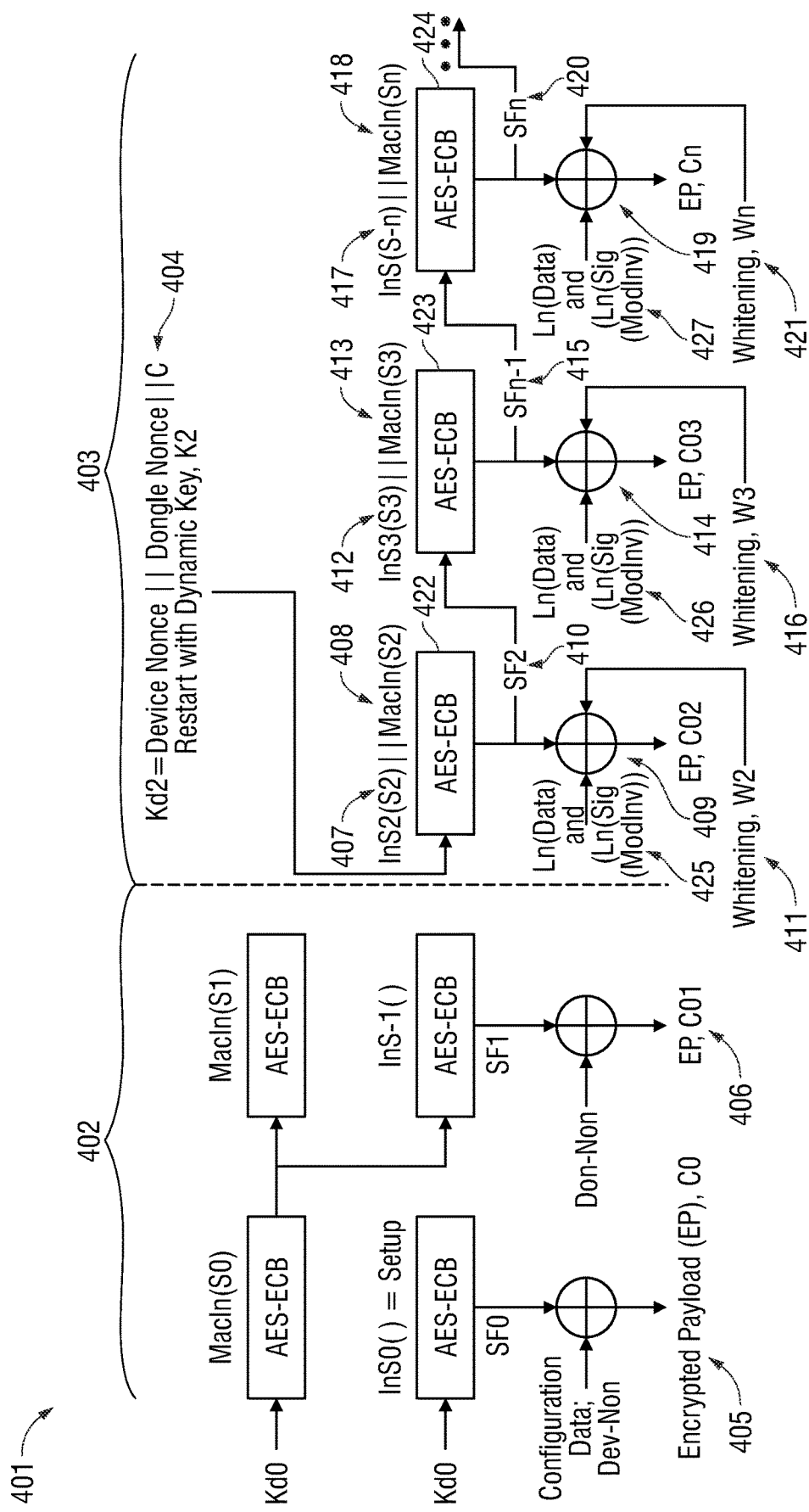
FIG. 4 is a block diagram of encryption of a data stream using a wireless IO data signing protocol with authenticated encryption according to an embodiment of the present disclosure.

FIG. 4 is a block diagram 401 of the signature and encryption algorithm of a data stream for a data packet communication frame including signing and encryption for encrypted wireless IO device input data packets to be transmitted between a wireless I/O device and a wireless communication dongle according to an embodiment of the present disclosure. As described herein, the methods described herein may be broken down into two larger phases: a setup phase 402 and a dynamic key encryption phase 403. The setup phase 402 may include a number of processes that result in the ability of the systems and methods described herein in order to create an initial key (Kd2) 404. The dynamic key encryption phase 403 relates to a chain of encryption steps to encrypt sequential data packets in a data packet stream via use of a generated data packet encryption output value (SF) as a dynamic key in a next round of encryption for a next wireless IO device input data packet according to the embodiments herein.

In an embodiment, the wireless communication between the wireless mouse or other wireless I/O device may engage with the wireless dongle when the wireless mouse is turned on or the wireless dongle is inserted into the USB port of the information handling system. A wireless setup process 402 may be conducted in order to coordinate the encryption and decryption parameters used to encrypt a plurality of data packets within a data packet communication frame (e.g., 5 data packets) that are transmitted from the wireless mouse to the wireless dongle and from the wireless dongle to the wireless mouse. Again, it is appreciated that the systems and methods described herein may be applicable to those data packet transmissions from the wireless dongle to the wireless mouse as well.

In an embodiment, the wireless mouse may send a request to connect wirelessly with the wireless dongle. This request may include data describing how data packets are going to be encrypted by the wireless mouse and, consequently, how the wireless dongle can decrypt the packets as they are streaming into the wireless dongle. In an example embodiment, the wireless mouse may send a wireless I/O device nonce to the wireless dongle. The device nonce (aka: DevNon) may include any random number generated by, for example, a random number generator. The device nonce may be transmitted to the wireless dongle as encrypted payload 405 encrypted using an XOR operator with a data packet encryption output value ($SF_0$) generated with a set up AES-ECB encryption of set up inputs such as Kao as a set up key. As described herein, this device nonce may be part of the data used by both the wireless mouse and wireless dongle to create the initial key, Kd2 404, used to encrypt (and later decrypt at the wireless dongle) the data packets within a packet communication frame sent from the wireless mouse to the wireless dongle. In an example embodiment, the data sent from the wireless mouse to the wireless dongle may further include an indication of a tap sequence polynomial function (e.g., located within a tap sequence polynomial function library maintained on the wireless mouse and wireless dongle individually) being used to define the tap sequences used with the first LFSR and the second LFSR (e.g., Ins( ) 407, 412, 417) described herein to create a 16-byte state machine output. Other data may be included with this setup data sent from the wireless mouse to the wireless dongle including, for example, data identifying the host identity (e.g., HostID) and data identifying the device identity (e.g., DevID).

The setup data may be encrypted using, for example, the AES-ECB encryption function to secure the data being transmitted at 405. In an embodiment, a MAC (MacIn(S0)) may be included with this transmission that can indicate to the wireless dongle whether the data was manipulated or accessed by a third party. If the MAC indicates that this setup data from the wireless mouse has been accessed or manipulated by a third party, the wireless dongle may send a transmission to the wireless mouse indicating as such and requesting new data such as an indication of a new tap sequence polynomial function to be used and a new device nonce. FIG. 4 shows that the configuration data from the wireless mouse is passed through an encryption using, for example, the AES-ECB algorithm with the output from the execution of this AES-ECB encryption algorithm using the device nonce and configuration data as a parameter resulting in an encrypted payload ($C_0$). In an embodiment, the AES-ECB algorithm may be used with an exclusive or (XOR) logic operator ("⊖") 409, 414, 419 with the device nonce, configuration data and the data packet encryption output value ($SF_0$). The data packet encryption output value ($SF_0$) is a result of the AES-ECB encryption of the third LFSR and fourth LFSR ($InS_0$( )) setup value and the set up key $K_{d0}$ to generate the data packet encryption output value ($SF_0$),), as directed by a chosen tap sequence polynomial function, as parameters to execute the AES-ECB.

This process may continue with an acknowledgement from the wireless dongle indicating that the wireless dongle has received the data, intact and unaltered at 406. This acknowledgment transmission may also include other additional data used to complete the setup process between the wireless mouse and wireless dongle in order to engage in the encryption process of the data packets within the data packet communication frames as described herein. For example, the additional data may include a dongle nonce (aka: Don-Non). The dongle nonce, similar to the device nonce, may be generated by a microcontroller at the wireless dongle executing a random number generator. Thus, the wireless dongle has both the device nonce and dongle nonce used to generate an Kd2 404 used to encrypt the first data packets within each data packet communication frame sent from the wireless mouse to the wireless dongle and from the wireless dongle to the wireless mouse. The setup data from the wireless dongle may also include the identification data associated with the wireless dongle in order to confirm that the wireless dongle 382 is authorized to communicate with the wireless mouse. In an embodiment, the output from the encryption of the MacIn(S0) may be input into an AES-ECB algorithm with a dongle nonce and the first LFSR and second LFSR (InS-1 ( ) shift register state machine value to generate a second data packet encryption output value ($SF_1$). The second data packet encryption output value ($SF_1$) is applied in an XOR operator with a dongle nonce to form a second encrypted payload ($C_{01}$) to deliver this data to the wireless device. With the dongle nonce (Don-Non) and wireless I/O device nonce (Dev-Non) value decrypted and verified as unaltered at both the wireless I/O device and wireless dongle, a hash function may be applied at each side to generate the initial key Kd2 for use in kicking off the encryption of the data packets in the dynamic key encryption phase 403 for transmission in the first data packet communication frame.

This completes the setup process 402 and the wireless device and wireless dongle may individually derive the initial key 404 using the dongle nonce and device nonce now held by each of these devices as an initial process during the dynamic key encryption phase 403. In an embodiment, each of the wireless device and wireless dongle may have executed a key setup hash function to derive this initial key 404 (Kd2). In an embodiment, the type of key setup hash function to be used during this process may have been negotiated during the setup process during the transmission of the device nonce and dongle nonce as described herein. In an embodiment, the key setup hash function may be a SHA-256 hash algorithm. Since key setup hash function is used only for the initial key derivation, this need for the computing resources in not required at later steps of the encryption of subsequent data packets in the dynamic key encryption phase 403.

Before encryption of the data packets, however, the present specification describes the application of a signature block to the wireless IO device input data payload within each data packet on a packet-by-packet basis. In an embodiment, the wireless mouse microcontroller may execute a wireless I/O data signing protocol and authenticated encryption agent to cause signature data (e.g., Sig) to be appended to the payload of a wireless IO device input data packet, shown as a LFSR distributed signature and LFSR distributed payload at 425, 426, 427, among the selected number of data packets to be sent to the wireless dongle. In an embodiment, the execution of the wireless I/O data signing protocol and authenticated encryption agent defines a length of a payload of a first data packet 425 within the packet frame by the hardware processing device of the wireless I/O device. In an embodiment, this length may be 8 bytes, however the present specification contemplates that this length of the payload may be different than that described herein. For ease of explanation, the length of the payload is selected as being 8 bytes (64 bits). After selecting the length of the payload, the execution of the wireless I/O data signing protocol and authenticated encryption agent causes the wireless mouse microcontroller to execute a modular inverse function using a selected prime number to the first data packet of the payload to generate a signature (Sig) used to authenticate the first data packet 425 when received by the wireless dongle. In an example embodiment, the 8-byte payload creates an 8-byte signature (Sig) when the modular inverse function is applied to it. At this point, the payload now consists of an 8-byte wireless IO device input data payload with an 8-byte signature appended to it.

The execution of the wireless I/O data signing protocol and authenticated encryption agent by the wireless mouse microcontroller causes a first LFSR to be applied to the signature in order to create a set of 8 bytes of pseudo-random bytes to scramble the signature. In an embodiment, similar to the third LFSR and fourth LFSR described herein, the first LFSR uses a tap sequence polynomial with the first LFSR to create these pseudo-random bytes of the signature. The tap sequence polynomial function may be the same tap sequence polynomial function used with the operation of the third LFSR or fourth LFSR described herein or may be a different tap sequence polynomial function maintained in the tap sequence polynomial library on the wireless mouse memory device as described herein. In an embodiment, the identification of the which tap sequence polynomial function is being used may be relayed to the wireless dongle during the setup phase 402.

The execution of the wireless I/O data signing protocol and authenticated encryption agent by the wireless mouse microcontroller further causes a second LFSR to be applied to the wireless IO device input data payload (e.g., Data) with a second tap to generate an LFSR distributed payload. Application of the second LFSR to the wireless IO device input data payload also creates pseudo-random bytes to scramble the wireless IO device input data of the payload. Again, during the execution of the second LFSR, a tap sequence polynomial may be used with the second LFSR to create these pseudo-random bytes to scramble the wireless IO device input data payload. The tap sequence polynomial function, in an example embodiment, is different than that tap sequence polynomial function used with the operation of the first LFSR or the third LFSR or fourth LFSR and is also maintained in the tap sequence polynomial library on the wireless mouse memory device. The differentiation between the tap sequence polynomial function used for the first LFSR and the second LFSR ensures that there is no convergent by trial-and-error LFSR function execution thereby preventing a third-party from detecting similar output from the encryption between to data packets and reversing the processes described herein. In an embodiment, the identification of the which tap sequence polynomial function is being used may be previously relayed to the wireless dongle during the setup phase.

The execution of the wireless I/O data signing protocol and authenticated encryption agent may also inform the mouse microcontroller that these processes are done so that the mouse microcontroller can execute the wireless I/O protocol authenticated encryption agent with bi-lateral LFSR stream as described herein. In an embodiment, prior to the encryption of the data packet (e.g., comprising the signature and LFSR distributed payload), an whitening process may be conducted to further add security to the data to promote anti-tampering of that data as it is being transmitted to the wireless dongle. In an embodiment, the whitening of the data packet may include an XOR processes that creates this masking process of the data in the data packet. In an embodiment, the whitening process may include an XOR operation with the data packet using output of a fifth LFSR.

The encryption process 403 may then continue with executing the AES-ECB algorithm using a third LFSR and a fourth LFSR. In an embodiment, an initial start state value ($S_0$) may have been assigned during the setup phase 402 indicating the start state of each of the third LFSR and fourth LFSR which is synchronized with a session counter (aka: Idx(n)) from the wireless mouse. The operation of the third LFSR and fourth LFSR reveals a session counter last byte to assist the wireless mouse to align with a session counter of the wireless dongle. A session counter may have been provided from the wireless dongle (e.g., Idx2) that is derived using a non-equal step size from the session counter obtained from the wireless mouse. In order to make sure that this non-equal step size is obtained and sent from the wireless dongle an inverse modulus (InvMod(Value, Modulus)) may be used, in an example embodiment. More particularly, the Idx1 reveals the session counter last byte to assist the wireless mouse to align the session counter with the primary transmitter (PTX) wireless dongle and the primary receiver (PRX) wireless mouse. In an embodiment, the Idx2 derived at the wireless dongle may be encrypted and sent to the wireless mouse.

At this point, the wireless mouse may interpret the Idx2 and execute the third LFSR and fourth LFSR functions (e.g., LnS( )) with the tap values, the step size value, and the current session value to produce input stream data. Again, the AES-ECB algorithm 422 may use the initial key Kd2, configuration data 408, and a current state machine function value from the third shifting LFSR and fourth shifting LFSR as a shifting state machine value ($InS_2(S2)$), as directed by the chosen tap sequence polynomial functions, as parameters to execute the first AES-ECB 422 encryption to generate the first data packet encryption output value ($SF_2$). The 16-byte state machine output is a shifting output where each 8-byte portion shifts in an example embodiment. The 16-byte state machine output shifts due to a shift in the third LFSR with a first tap sequence polynomial function and a shift in the fourth LFSR with a second a tap sequence polynomial function. Each side, the wireless IO device and the wireless communication dongle, has a matching third shifting LFSR and a matching fourth shifting LFSR.

The AES-ECB algorithm 422, 423, 424 by the wireless I/O protocol authentication encryption agent with bi-lateral LFSR generates the data packet encryption output value ($SF_2$) used to encrypt, using an exclusive or (XOR) logic operator ("@") such as at 409, a first data packet (now containing the LFSR distributed signature and LFSR distributed payload) and the first data packet encryption output value ($SF_2$) 410 to generate a first encrypted payload packet (EP) for the first encrypted packet ($C_{O2}$) of an encrypted stream (ES) in the data packet communication frame in an example embodiment. In an embodiment, the XOR operator 409 may be conducted with the first data packet and the first data packet encryption output value ($SF_2$) 410 as well as a whitening function value W2 411. The order of the XOR operator 409 with respect to the first data packet, the first data packet encryption output value ($SF_2$) 410, and the whitening function value W2 411 may be any order with the order of operation being relayed, previously, to the wireless dongle during the initial setup phase 402 in order to reverse the process during decryption at the wireless dongle by the wireless dongle microcontroller.

After each execution of the AES-ECB the session counter is updated with the first LFSR, second LFSR, third LFSR, and fourth LFSR current values updated. The session counter is tracked such that a full cycle of the third LFSR and fourth LFSR states, in particular, are produced. Example pseudo code for this encryption process may be as follows:

```
//Pseudo Code, Maximum States, Non-Repeated Encrypted Stream /Input Stream design
C_LFSR1, C_LFSR2 Initialized according to Setup
//Session Counter ,SC
Idx2= Random(2..30) //Idx2 is encrypted before sending from Dongle to Dev
//InvMod ( ) Modulus Inverse
StepMove= InvMod(Idx2 %31 ,31) //Step Varying function
// LFSR -Linear Feedback Shift Register, state value changed according to Tap setup. Provide
maximum
SC=SC+StepMove
C_LFSR1=LFSR( idx2, C_LFSR1, Tap1) //2 Independent LFSR running with unequal state
change
C_LFSR2=LFSR( StepMove, C_LFSR2, Tap2) // LFSR2 is moving inverse Modulus of LFSR1
```

```
steps
InpSn= C_LFSR1|| C_LFSR2 // Getting all 16 bytes
MACn= ModInv( PL||SC , PrimeList[idx2 %31] ) // Signature is formed by Modulus Inverse,
always provide 1 to 1 for the data when modinverse with a Prime Number > the Payload
||SC[1.:4]
Key= ESn-1 // Last
ES= ECB-AES ( Key , C_LFSR1 || C_LFSR2) //ES Encrypted Stream for User Payload
encryption
EP= ES XOR Payload XOR Whitening( ) // XOR Exclusive OR , Whitening to protect NULL
Data revealing ES
IdxEncrypted= LFSR1[0..1] XOR LFSR2[6..7] //This value can be used to encrypt next Idx2
Check SC> 0x FF FF FF FF FF FF FF 80 , states used up , reset SC =1. LFSR1, LFSR2 to
different startup value
```

In an embodiment, the whitening algorithm may be an additional LFSR output and this whitening output, as shown at 411, 416, 421, may be applied to the encryption of the wireless I/O data packets as well to further uncorrelate the encrypted packet (e.g., $C_{02}$). This process, via the execution of the I/O device wireless communication packet polling and reception agent of the wireless mouse (and the I/O device wireless communication packet polling and reception system of the wireless dongle) by the mouse microcontroller (and wireless dongle microcontroller) causes the execution of the encryption algorithm, using the XOR operator such as 409 with the first data packet encryption output value (e.g., $SF_2$) 410, with the whitening function 411, and with first data packet as the LFSR distributed signature and LFSR distributed payload to generate the encrypted packet (e.g., $C_{02}$) that is further uncorrelated.

In a further embodiment, the execution of the I/O device wireless communication packet polling and reception agent or system uses the first data packet encryption output value (e.g., $SF_2$) 410 as a subsequent, dynamic key for encryption of a second wireless IO device data packet. The first data packet encryption output value (e.g., $SF_2$) 410 as a subsequent, dynamic key and output from each of the shifted third LFSR and shifted fourth LFSR lnS3(S3) 412 are the parameters used with AEC-ECB encryption algorithm 423, to encrypt a second data packet via a next data packet encryption output value (e.g., $SF_{n-1}$) 415. It is further appreciated that the payload of the second data packet may be subjected to the signature process described herein with the execution of the wireless I/O data signing protocol and authenticated encryption agent. This again generates a 16-byte payload that includes the data and signature 426 used with the encryption of the 16-byte payload as described herein. Then the first LFSR and second LFSR are used to scramble the signature and wireless IO device input data payload to generate a LFSR distributed signature (Ln(Sig ModInv)) and a distributed wireless IO device input data payload (Ln (Data)).

The second data packet encryption output value (e.g., and $SF_{n-1}$) 415 is used with XOR operator 414 to encrypt the second wireless I/O device data packet to yield an encrypted payload (EP) of the second encrypted data packet $C_{03}$. The XOR operator is applied to the distributed signature (Ln(Sig ModInv)) and a distributed wireless IO device input data payload (Ln(Data)) 426 for the second wireless IO device input data payload with the second data packet encryption output value (e.g., and $SF_{n-1}$) 415, and with another whitening process value W3 416. The whitening steps described herein (e.g., W2/W3 . . . . Wn) may be used to eliminate a single layer XOR encryption scheme thereby adding security steps to the systems and methods described herein. The second data packet encryption output value (e.g., $SF_{n-1}$) 415 then is used as a dynamic key with the next AES-ECB encryption 424 and the next shifted dual LFSR state machine value lnS(S−n) at 417 to generate yet another data packet encryption output value (e.g., $SF_n$) 420 for use in encrypting with XOR operator 419 and the distributed signature (Ln(Sig ModInv)) and a distributed wireless IO device input data payload (Ln(Data)) 427 for the next wireless IO device input data payload to yield another encrypted data packet $C_n$. These rounds of signature and encryption continue for the data packet stream through a data packet communication frame and across to a next data packet communication frame in embodiments herein. The execution of the I/O device wireless communication packet polling and reception agent or system may proceed along the chain with the above parameters to encrypt, or later decrypt, subsequent data packets within the data packet communication frame according to embodiments herein. Further whitening values 416 and 421 (e.g., W3 or Wn) may be used in some embodiments with the XOR operators 414 and 419 to encrypt the wireless I/O data packets (e.g., $C_{02}$, $C_{03}$, $C_n$).

In a further embodiment, a MAC 408, 413, 418 may be included with the transmissions of each encrypted data packet that can indicate to the wireless dongle whether the data was manipulated or accessed by a third party. MAC 408, 413, and 418 may be included in the AES-ECB encryption algorithm as a parameter in some embodiments. If the MAC indicates that this setup data has been accessed or manipulated by a third party, the wireless dongle may send a transmission to the wireless mouse indicating as such and requesting new data packets such as an indication of a new tap sequence polynomial function to be used and a new device nonce. The inclusion of the MAC 408, 413, and 418 may further strengthen the systems and methods described herein where an encryption hack is presented at the wireless mouse from a direct hardware tampering by a third-party.

In an embodiment, therefore, the data packet encryption output value 410, 415, or 420 that were used to encrypt via an XOR operator a previously encrypted packet among the plurality of data packets sent within the packet communication frame is used as a dynamic key and one of the parameters in an AES-ECB 422, 423, or 424 to generate a next data packet encryption output value to encrypt a subsequent data packet via another XOR operator in the data that packet communication frame.

Because the data packet encryption output value from the previously encrypted packet and the shifted 16-byte state machine output from the first LFSR and second LFSR are used as parameters in an AES-ECB encryption to generate a next data packet encryption output value to encrypt a subsequent packet, the immunity to an attack from a third party via, for example, a brute force operation is improved substantially, for example, approximately $2^{128}$ better, than would have been otherwise using just the AES encryption for each packet. Additionally, because the encryption method implements two LFSRs (e.g., the first LFSR and second LFSR) in parallel for each encryption or decryption of each data packet, the ability for a third party to obtain all of the encrypted data packets in order to reverse the encryption method is hindered due to the time and number of encrypted packets necessary to complete and reverse that encryption. Further, the two first LFSRs and two second LFSRs in parallel are lower energy and require less computer ability than use of a hash function, for example. Indeed, it is anticipated that a user of the wireless mouse may not cycle through the possible encrypted data packets within a set time before the wireless mouse goes into a sleeping mode or is turned off, for example, thereby resetting the start state of the first LFSR and second LFSR. However, the decryption of these data packets may be relatively quick by the wireless dongle or wireless mouse (depending on which device is transmitting and which is receiving) due to the initial key being known (e.g., the device nonce, wireless dongle nonce, and key setup hash function being known), the parallel implemented tap sequence polynomial function being known, and the number of packets being known to be received within the packet communication frame. Both sides may track sessions to maintain parallel values for encryption and decryption. This increases security of the data being transceived between the wireless I/O device (e.g., the wireless mouse in this example) and the wireless dongle while still allowing for quick transmission of data packets in a packet communication frame as described herein.

The execution of the wireless I/O data signing protocol and authenticated encryption agent by the wireless mouse microcontroller also provides for the signing of the data packets, packet by packet, prior to delivery to the wireless dongle and wireless mouse, respectively. Additionally, the execution of the wireless I/O data signing protocol and authenticated encryption agent, more specifically, creates a signature to be appended to a portion of the payload of a data packet in which a first LFSR and second LFSR used to further create pseudo-random bytes within the signature and the payload for an LFSR distributed signature and LFSR distributed payload prior to the encryption of this data. By adding the signature and creating the pseudo-random bytes within the signature and payload to scramble them, a third-party who accesses the transmission may not be able to detect the information on the payload. Additionally, if the third-party was to change the data, the wireless dongle, upon receipt and decryption of the payload and signature within the data packet will know that data has been changed with the signature authentication thereby allowing the wireless dongle to request that that data packet be resent by the wireless mouse for example.

Figure 5:
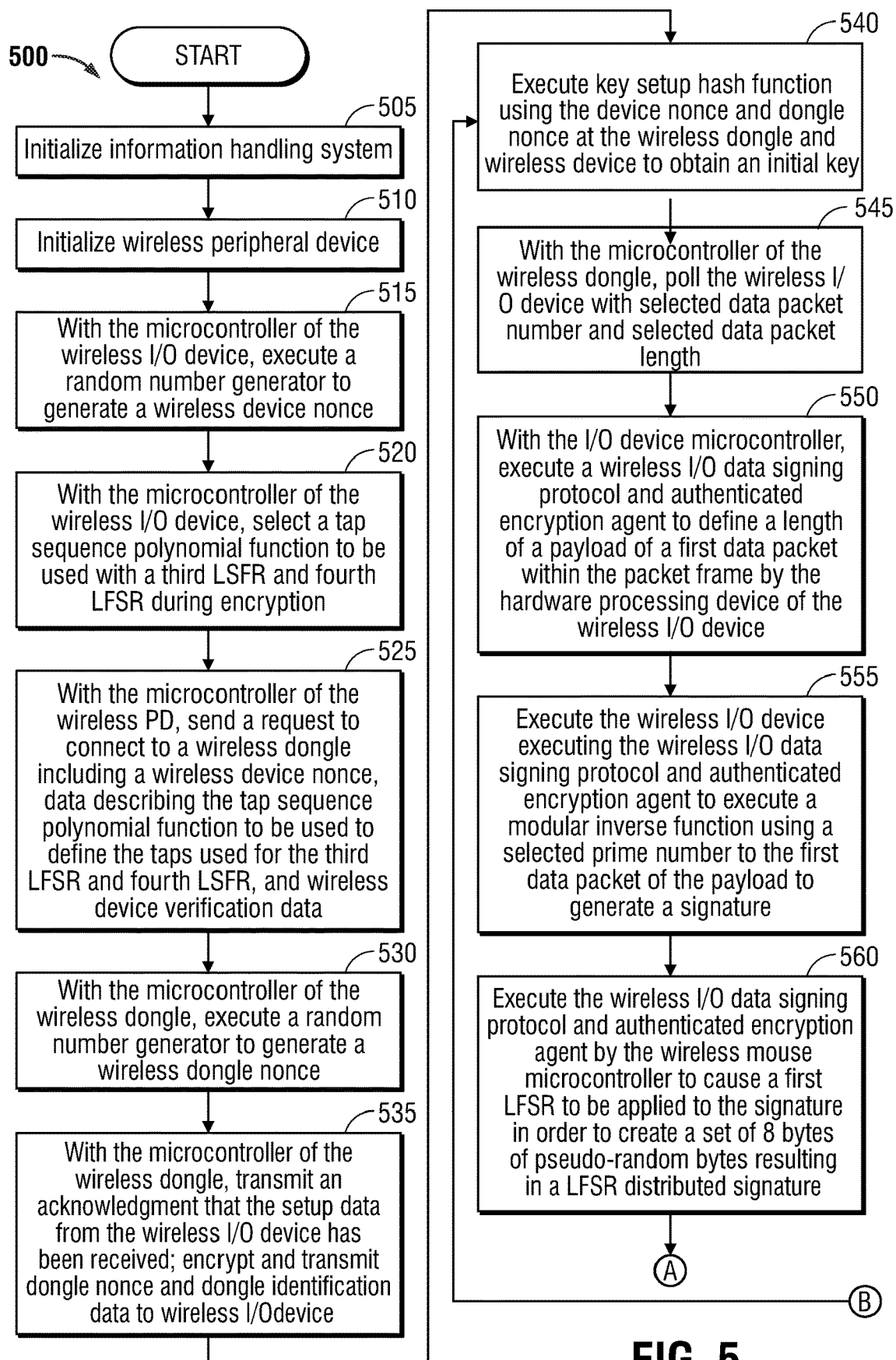
FIG. 5 is a block flow diagram of a method of signing and encrypting a packet data stream into encrypted data packets for wireless transmission between a wireless I/O device and a wireless communication dongle with a wireless I/O data signing protocol and authenticated encryption system or agent and using a bi-lateral LFSR stream according to an embodiment of the present disclosure.
Figure 5:
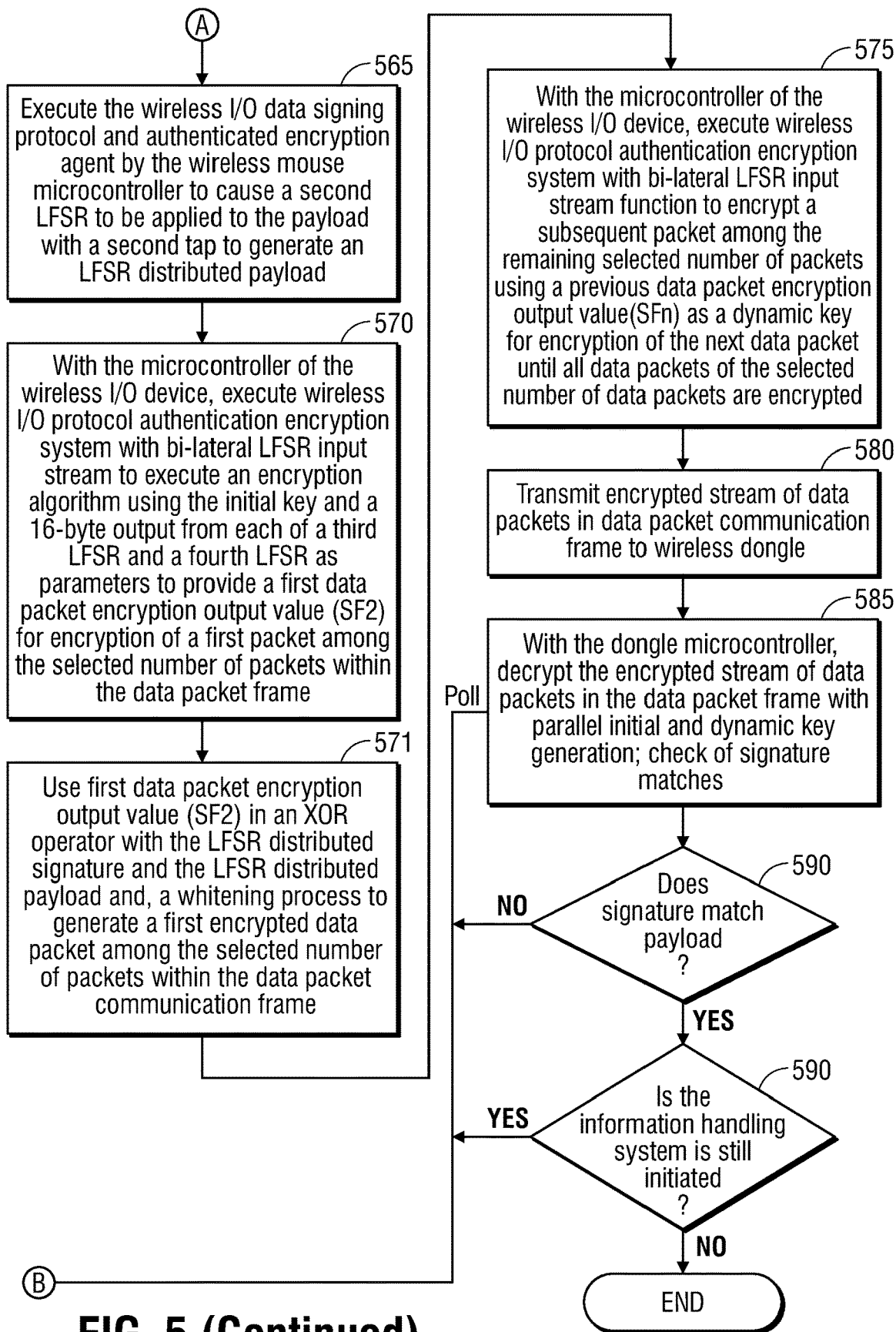

FIG. 5 is a block flow diagram of a method 500 of encrypting a packet data stream of wireless I/O data packets in a data packet communication frame according to an embodiment of the present disclosure. The method 500 describes, in an embodiment, the communications between a wireless I/O device and a wireless dongle, as described herein and the systems and methods described herein apply equally to a wireless mouse as in the example embodiment as well as other types of I/O devices. Additionally, the wireless dongle may be operatively coupled to an information handling system via, for example, a USB port and therefore operatively coupled to a hardware processing device of the information handling system in an embodiment. In an alternative embodiment, the information handling system may include a wireless interface adapter (e.g., FIG. 1, 128) that communicates with the wireless I/O device using the systems and methods described herein.

In an embodiment, the method 500 may include, at block 505, initializing the information handling system. In an embodiment, the initialization of the information handling system is accomplished by the user actuating a button that causes power to be provided to a processing device, a memory device, and other hardware devices including the wireless dongle described herein. Alternatively, power may be provided to a wireless interface adapter used to communicate with the wireless I/O device. In the example embodiment, and for case of understanding, the wireless I/O device is a wireless mouse.

At block 510, the method 500 includes initializing the wireless I/O device. Similar to the information handling system, the initialization of the wireless I/O device may include the user actuating a button on the wireless I/O device. This initialization may cause a power management unit to direct a battery supply power to a wireless I/O device microcontroller.

The method 500 includes wirelessly setting up the wireless communication link between the wireless I/O device and the wireless dongle in order to coordinate the encryption and decryption parameters used to encrypt and decrypt a plurality of data packets within a data packet communication frame (e.g., 5 data packets) that are transmitted from the wireless I/O device to the wireless dongle pursuant to a polling packet from the wireless dongle to the wireless I/O device in an embodiment. Although the present method describes the encryption and transmission of these data packets within the data packet communication frame from the wireless I/O device to the wireless dongle, it is appreciated that the systems and methods described herein are applicable to those data packet transmissions from the wireless dongle to the wireless I/O device as well.

In an embodiment, at block 515, the method 500 includes executing a random number generator with the wireless I/O device microcontroller in order to generate a wireless I/O device nonce. As described herein, this wireless I/O device nonce, along with a dongle nonce received via startup encryption, may be used as input in a key setup hash function to generate an initial key at the wireless I/O device. A similar key setup hash function is used with the wireless I/O device nonce provided via startup encryption and the dongle nonce is also used at the wireless dongle to generate the same initial key. The key setup hash function may be a key setup hash function known to the wireless I/O device and wireless dongle and individually stored as computer-readable code on a memory device at each of the wireless I/O device and wireless dongle. Because this key setup hash function is present between the wireless I/O device and wireless dongle, the execution of the key setup hash function using the wireless device nonce and wireless dongle nonce as input parameters results in each of the wireless I/O device and wireless dongle using and identifying the same initial key that is used to encrypt the first data packet within the data packet communication frame. In an embodiment, the key setup hash function may be a secure hash algorithm 256 (SHA-256). In an embodiment, the specific algorithm used to create this initial key may be selected or identified in the initial negotiation transmissions between the wireless I/O device and wireless dongle therefor allowing for other hash functions or algorithms being used to create this initial key.

At block 520, the microcontroller of the wireless I/O device selects plural tap sequence polynomial functions to be used each with a third LFSR and fourth LFSR separately during encryption and decryption. In an embodiment, the tap sequence polynomial function may be those of many maintained within a tap sequence polynomial function library maintained on the wireless I/O device and wireless dongle individually. Each of the wireless I/O device and wireless dongle may include a pair of third LFSR and fourth LFSR and the same set of tap sequence polynomial functions such that selection of one by the wireless I/O device microcontroller allows the wireless dongle microcontroller to use a similar set of tap sequence polynomial functions during encryption or decryption. The third LFSR operates at both the wireless I/O device and dongle and the fourth LFSR also operates at both the wireless I/O device and the dongle in embodiments of the present disclosure.

The method 500 includes, at block 525, the wireless I/O device sending a request to connect wirelessly with the wireless dongle. This request may include that data describing how data packets are going to be encrypted by the wireless I/O device and, consequently, how the wireless dongle can decrypt the packets as they are streaming into the wireless dongle. In an example embodiment, the wireless I/O device may send the wireless I/O device nonce from block 515, the data describing the tap sequence polynomial functions to be used to define the taps used for the third LFSR and fourth LFSR from block 520, as well as other data used to verify the wireless device. This other data may be included with this setup data sent from the wireless I/O device to the wireless dongle and may include, for example, data identifying the host identity (e.g., HostID) and data identifying the device identity (e.g., DevID).

In an embodiment, this setup data may be encrypted using, for example, the AES-ECB encryption function to secure the data being transmitted. In an embodiment, a message authentication code (MAC) may be included with this transmission that can indicate to the wireless dongle whether the data was manipulated or accessed by a third party. If the MAC indicates that this setup data has been accessed or manipulated by a third party, the wireless dongle may send a transmission to the wireless I/O device indicating as such and requesting new data such as an indication of a new tap sequence polynomial function to be used and a new wireless I/O device nonce.

At block 530, a microcontroller at the wireless dongle may also execute a random number generator to generate a dongle nonce. The execution of the random number generator may cause the dongle nonce to be different than the wireless device nonce and may implement an inverse modulus (InvMod(Value, Modulus)) in order to prevent the wireless device nonce from being equal to the dongle nonce. As described above, this dongle nonce and the received wireless I/O device nonce described above and received via a startup encryption is decrypted and is used to generate an initial key (e.g., Kd2) via an agreed hash function for decrypting received encrypted data packets from the data packet communication frames as described below. A similar initial key (e.g., Kd2) is generated as described in embodiments herein for encryption at the wireless I/O device.

At block 535, the method 500 may continue with an acknowledgement being sent from the wireless dongle indicating that the wireless dongle has received the data, intact and unaltered. This acknowledgment transmission may also include other data used to complete the setup process between the wireless I/O device and wireless dongle in order to engage in the encryption process of the wireless IO input data packets within the data packet communication frames as described herein. For example, the additional data may include a dongle nonce. The dongle nonce may also be sent in an encrypted format to the wireless I/O device using a startup encryption and other protection. As a consequence, the wireless dongle and the wireless I/O device both have the device nonce and dongle nonce.

Proceeding to block 540, the device nonce and dongle nonce are both used to generate an initial key used to encrypt or decrypt the data packets within each data packet communication frame sent from the wireless I/O device to the wireless dongle and from the wireless dongle to the wireless I/O device. A similar key setup hash function is used at the wireless I/O device and the wireless dongle to generate the same initial key as described in embodiments herein. The key setup hash function may be a key setup hash function known to the wireless I/O device and wireless dongle and individually stored as computer-readable code on a memory device at each of the wireless I/O device and wireless dongle. Because this key setup hash function is present between the wireless I/O device and wireless dongle, the execution of the key setup hash function uses both the wireless device nonce and wireless dongle nonce as input parameters and results in each of the wireless I/O device and wireless dongle using and identifying the same initial key that is used to encrypt or decrypt the first data packet within the data packet communication frame. In an embodiment, the key setup hash function may be a SHA-256 hash algorithm. In an embodiment, the specific algorithm used to create this initial key may be selected or identified in the initial negotiation transmissions between the wireless I/O device and wireless dongle therefor allowing for other hash functions or algorithms being used to create this initial key. The setup data from the wireless dongle may also include the identification data associated with the wireless dongle to confirm that the wireless dongle is authorized to communicate with the wireless I/O device.

At block 545, the method 500 includes the wireless dongle generating and transmitting a polling packet to the wireless I/O device. This polling packet may include an instruction for a selected number of encrypted data packets and a selected data packet length within a given data packet communication frame to be sent from the wireless I/O device, (e.g., wireless mouse) to the wireless dongle. For example, this polling packet may provide the wireless I/O device with an indication of the selected number of data packets expected to be received (e.g., 5 data packets) within any given data packet communication frame as well as the expected time frame in which these selected number of data packets and the entire data packet communication frame is to be received at the wireless dongle based on data packet length. It is appreciated as well that this polling packet may be sent to the wireless I/O device and may be adjustable on the fly as to the selected number of encrypted data packets or selected data packet length to be expected to be received by the wireless dongle based on changes due to the wireless communication dongle or the performance requirements from the wireless I/O device. For example, changes may occur due to currently executing software applications by the hardware processor of the information handling system or by any detected data packet transmission failures that require a remedy and detected at the wireless dongle, among other factors. Changes to the selected number of encrypted data packets or the selected data packet length may be made, in an example embodiment, via the polling packets for example.

At block 550, the method proceeds with the wireless mouse microcontroller executing a wireless I/O data signing protocol and authenticated encryption agent to cause signature data to be appended to the payload of a data packet among the selected number of data packets to be sent to the wireless dongle. At block 550, the execution of the wireless I/O data signing protocol and authenticated encryption agent causes the wireless I/O device (e.g., the wireless mouse) to defines a length of a payload of a first wireless IO device input data packet within the data packet communication frame by the hardware processing device of the wireless I/O device. In an embodiment, this length may be 8 bytes, however the present specification contemplates that this length of the payload may be different than that described herein. For case of explanation, the length of the payload is selected as being 8 bytes (64 bits).

At block 555, the method includes the wireless I/O microcontroller of the wireless I/O device executing the wireless I/O data signing protocol and authenticated encryption agent to execute a modular inverse function using a selected prime number to the first wireless IO device input data packet of the payload to generate a signature used to authenticate that first wireless IO device input data packet when received by the wireless dongle. In an example embodiment, the 8-byte payload creates an 8-byte signature when the modular inverse function is applied to it. At this point, the payload now consists of an 8-byte payload with an 8-byte signature appended to it.

At block 560, the execution of the wireless I/O data signing protocol and authenticated encryption agent by the wireless mouse microcontroller 172 causes a first LFSR 168-1 to be applied to the signature in order to create a set of 8 bytes of pseudo-random bytes to scramble the signature resulting in a LFSR distributed signature. In an embodiment, similar to the third LFSR and fourth LFSR described herein, the first LFSR uses a tap sequence polynomial with the first LFSR to create these pseudo-random bytes of the signature. The tap sequence polynomial function may be the same tap sequence polynomial function used with the operation of the third LFSR or fourth LFSR described herein or may be a different tap sequence polynomial function maintained in the tap sequence polynomial library on the wireless mouse memory device as described herein. In an embodiment, the identification of the which tap sequence polynomial function is being used may be relayed to the wireless dongle during the setup phase.

At block 565, the execution of the wireless I/O data signing protocol and authenticated encryption agent by the wireless mouse microcontroller further causes a second LFSR to be applied to the payload with a second tap to scramble the wireless IO device input data to generate an LFSR distributed payload. Application of the second LFSR to the payload also creates pseudo-random bytes of the payload. Again, during the execution of the second LFSR, a tap sequence polynomial may be used with the second LFSR to create these pseudo-random bytes of the payload. The tap sequence polynomial function, in an example embodiment, is different than that tap sequence polynomial function used with the operation of the first LFSR or the third LFSR and fourth LFSR and is also maintained in the tap sequence polynomial library on the wireless mouse memory device. The differentiation between the tap sequence polynomial function used for the first LFSR or the second LFSR ensures that there is no convergent by trial-and-error LFSR function execution thereby preventing a third-party from detecting similar output from the encryption between to data packets and reversing the processes described herein. In an embodiment, the identification of the which tap sequence polynomial function is being used may be previously relayed to the wireless dongle during the setup phase.

At block 570, the microcontroller of the wireless I/O device may begin encryption of wireless I/O device input data packets for the transmission of the selected number of encrypted data packets within the data packet communication frame thereby creating an encrypted stream (ES) of encrypted data packets being transmitted from the wireless I/O device to the wireless dongle in data packet communication frames. At this point, the execution of the wireless I/O protocol authentication encryption agent with bi-lateral LFSR input stream and I/O device wireless communication packet polling and reception agent (e.g., FIG. 1, 160-1, 186-1) by the wireless I/O device microcontroller causes these wireless I/O device input data packets within the data packet communication frame being sent from the wireless I/O device to be encrypted. In an embodiment, the execution of the wireless I/O protocol authentication encryption agent with bi-lateral LFSR input stream at the wireless I/O device causes the wireless I/O device microcontroller to execute an encryption algorithm, such as the AES-ECB algorithm, using the initial key for a first data packet and a shifting 16-byte state machine output from each of a third shifting LFSR (e.g., FIG. 1 168-1) and a fourth shifting LFSR (e.g., FIG. 1, 170-1) as parameters in the encryption algorithm. Then, AES-ECB encryption algorithm generates a first data packet encryption output value (e.g., $SF_2$) at block 570. This first data packet encryption output value (e.g., $SF_2$) is the beginning of a chain of encryption steps similar to block 570 here and block 571 below to encrypt the selected number of wireless IO device input data packets in a data packet communication frame. The first data packet encryption output value (e.g., $SF_2$) is used to encrypt the data packet via the LFSR distributed signature and LFSR distributed payload using an XOR operator to generate the first encrypted data packet.

At block 571, the first data packet encryption output value (e.g., FIG. 4, $SF_2$) is used in an XOR operator with the first wireless IO device input data packet, in the form of the LFSR distributed signature and LFSR distributed payload, to generate a first encrypted data packet among the selected number of packets (e.g., 5 packets) within the data packet communication frame. This generated first data packet encryption output value is then used as a dynamic key for a next round of encryption of a second data packet, and so forth. In an embodiment, prior to the encryption of the data packet (e.g., comprising the signature and LFSR distributed payload), a whitening process may be conducted to further add security to the data to promote anti-tampering of that data as it is being transmitted to the wireless dongle. In an embodiment, the whitening of the wireless IO device input data packet, as a the LFSR distributed signature and LFSR distributed payload, may include an XOR processes that creates this additional masking process of the data in the data packet using an additional whitening function output value (W) known to the wireless mouse and the wireless dongle. The whitening function may be output of yet another, fifth LFSR in an example embodiment where this additional, fifth LFSR has a parallel counterpart at both the wireless mouse and the wireless dongle. In an embodiment, this whitening process may include an XOR operation with the data packet using output of a fifth LFSR as well as the LFSR distributed signature and LFSR distributed payload and the first data packet encryption output value ($SF_2$). As described herein, an AES-ECB algorithm encrypted by the wireless I/O protocol authentication encryption agent with bi-lateral LFSR input to generate the first data packet encryption output value ($SF_2$) and then using an exclusive or (XOR) logic operator ("$\ominus$") with a first data packet (now containing the LFSR distributed signature and LFSR distributed payload) and the first data packet encryption output value ($SF_2$)

generates a first encrypted payload packet (EP) for the first encrypted packet ($C_{O2}$) of an encrypted stream (ES) in the data packet communication frame in an example embodiment. In an embodiment, the XOR operator may be conducted with the first data packet and the first data packet encryption output value ($SF_2$) as well as the whitening function value output. The order of the XOR operator with respect to the first data packet, the first data packet encryption output value ($SF_2$), and the whitening function value may be any order with the order of operation being relayed, previously, to the wireless dongle during the initial setup phase in order to reverse the process during decryption at the wireless dongle by the wireless dongle microcontroller.

The execution of wireless I/O protocol authentication encryption agent with bi-lateral LFSR input stream by the I/O device microcontroller, at block 575, uses the data packet encryption output value (e.g., FIG. 4, $SF_2$ or $SF_n$ from a later stage in the encryption chain) from a previous data packet (e.g., a first data packet) encryption as the next dynamic key to be used along with a shifted state machine output from each of the third LFSR and fourth LFSR (16-byte state machine output) as the parameters, generate yet another data packet encryption output value ($SF_n$) to encrypt a next packet among the selected number of packets in the data packet communication frame. At the end of the data packet communication frame, the latest data packet encryption output value ($SF_n$) may be saved for use in encryption of a first data packet in a next data packet communication frame in embodiments herein. This encryption process and those processes at blocks 560 and 565 are repeated until all the data packets within the selected number of data packets within the data packet frame have been encrypted.

In an embodiment, the encryption algorithm, such as the AES-ECB, is used with the initial key or any later-generated dynamic keys ($SF_n$) that are most recently generated data packet encryption output values and a shifting 16-byte state machine output from each of third LFSR, and fourth LFSR which may separately shift for a next data packet encryption output value to apply an XOR operator with output of the first LFSR to generate the LFSR distributed signature and second LFSR to generate the LFSR distributed payload during each data packet round of encryption. The encryption chain may generate successive data packet encryption output values for each round as dynamic key for the following round. Each successive data packet encryption output value encrypts a wireless I/O data packet among the selected number of data packets among the packet communication frame or across plural data packet communication frames.

At block 580 the encrypted stream is transmitted from the wireless device to the wireless dongle via execution of code instructions of the I/O device wireless communication packet polling and reception agent by the microcontroller of the wireless I/O device. Again, the number of now-encrypted data packets sent may define a data packet communication frame of encrypted data packets responsive to the wireless dongle polling packet according to embodiments of the wireless I/O device communication protocol of embodiments herein. The wireless dongle, upon receipt of the encrypted data packets may then determine if data packet errors occurred and, as described in block 585, reply in a next polling packet with an acknowledgment of receipt of the encrypted data packets and instructions for selected number of encrypted data packets and selected data packet lengths for a next data packet communication frame from the wireless I/O device.

The encrypted stream is then decrypted at block 585 by the execution of the wireless I/O protocol authentication encryption system with bi-lateral LFSR input stream at the wireless dongle microcontroller. The wireless I/O protocol authentication encryption system with bi-lateral LFSR input stream uses the initial key or dynamic key, shifting tap sequence polynomial function for the four LFSRs, and session counter in a reverse approach to decrypt each encrypted packet within the data packet communication frames as they are received within the encrypted stream. Again, because each of the wireless I/O device and wireless dongle have negotiated the taps used for each of the first LFSR, the second LFSR, the third LFSR, and the fourth LFSR using a plurality of tap sequence polynomial functions, the eventual decryption of these data packets at the wireless dongle may be completed.

At block 585, the wireless communication dongle microcontroller may reverse the process of encryption to generate the unencrypted wireless I/O device input data that was sent from the wireless I/O device. The decryption process at the wireless communication dongle may include parallel utilization of an initial key or the dynamic keys and application of the AES-ECB algorithm with the shifting LFSR state machine 16-byte value that from a parallel third LFSR and a parallel fourth LFSR that parallels the same used at the wireless I/O device during encryption for generating a data packet encryption output value. Application of the XOR operator on the encrypted data packet with the in-step generated data packet encryption output value ($SF_n$) will yield an unencrypted LFSR distributed signature and LFSR distributed payload. Still further, parallel first LFSR and second LFSRs are used to undo or unscramble the creation of the pseudo-random bytes associated with the LFSR distributed signature and second LFSR to generate the LFSR distributed payload to yield the unencrypted signature and wireless IO device input data payload.

Further, the generated data packet encryption output value may be used as an input parameter in the AEC-ECB algorithm in the next step for the next received encrypted data packet in the data packet communication frame as well. After the selected number of encrypted data packets for any of these data packet communication frames has been decrypted, the wireless dongle microcontroller may deliver the decrypted wireless I/O device input data from the wireless I/O device to the operating system and any wireless I/O device drivers of the information handling system according to embodiments herein.

It is appreciated as well that, at block 590, that the wireless dongle microcontroller may check if the signature matches the payload. The signature value may be used for comparison to the payload to see if they match to authenticate that the wireless IO device input data received has not been tampered with. To do so, after the decryption has been completed and the wireless dongle microcontroller has implemented the first LFSR and second LFSR to undo the creation of the pseudo-random bytes, it runs a reverse the process of the modular inverse function to determine if the signature matches the payload. Where the signature does not match the payload, the wireless dongle may transmit a notice to that the data packet was not received correctly during an acknowledgement and polling process as described herein and may request, in an embodiment, transmission of that incorrect data packet. Where the signature does match the payload the method 500 continues to block 595.

In an embodiment, therefore, the generation of a data packet encryption output value used for a previously encrypted packet among the plurality of data packets sent within the packet communication frame from the wireless I/O device is used for a dynamic key as one of the parameters to decrypt a next data packet in the packet communication frame or, in some embodiments, a next data packet communication frame at block 585 while the signature is used to determine whether a third-party has intercepted and changed the data or data was incorrectly encrypted. Because the data packet encryption output value used to decrypt the previously encrypted packet and the shifted output from the third LFSR and fourth LFSR are used as parameters to decrypt the next data packet, the immunity to an attack from a third party via, for example, a brute force operation is improved substantially and better than would have been otherwise using the AES encryption for each packet. Additionally, because the encryption/decryption method implements two LFSRs (e.g., the third LFSR and fourth LFSR) in parallel for each encryption or decryption of each data packet, the ability for a third party to obtain all of the encrypted data packets in order to reverse the encryption method is hindered due to the time and number of encrypted packets necessary to complete and reverse that encryption. Further, the operation of the third LFSR and fourth LFSR in parallel are lower energy and require less computer ability than use of a hash function, for example. Indeed, it is anticipated that a user of the wireless mouse may not cycle through the possible encrypted data packets within a set time before the wireless mouse goes into a sleeping mode or is turned off, for example, thereby resetting the start state of the third LFSR and fourth LFSR. However, the decryption of these data packets may be relatively quick by the wireless dongle or wireless mouse (depending on which device is transmitting and which is receiving) due to the initial key being known (e.g., the device nonce, wireless dongle nonce, and key setup hash function being known), the parallel implemented tap sequence polynomial function being known, and the number of packets being known to be received within the packet communication frame.

The above increases security of the data being transceived between the wireless I/O device (e.g., the wireless mouse in this example) and the wireless dongle while still allowing for quick transmission of data packets in a packet communication frame as described herein. Additionally, the execution of the wireless I/O data signing protocol and authenticated encryption agent creates a signature to be appended to a portion of the payload of a data packet in which a first LFSR and second LFSR used to further create pseudo-random bytes within the signature and the payload prior to the encryption of this data. By adding the signature and creating the pseudo-random bytes within the signature and payload, a third party who accesses the transmission may not be able to detect the information on the payload. Additionally, if the third-party was to change the data, the wireless dongle, upon receipt and decryption of the payload and signature within the data packet will know that data has been changed thereby allowing the wireless dongle to request that that data packet be resent by the wireless mouse for example.

The method 500 may proceed to block 595, with determining whether the information handling system, wireless dongle, or wireless I/O device is still initiated or not. Where the information handling system, the wireless dongle, or wireless I/O device is still initiated at block 570, the method may return to block 540 with the wireless dongle polling the wireless IO device for an additional data packet communication frame with a selected number of encrypted data packets. The microcontroller of the wireless dongle generates a polling packet and transmits the same the wireless device with an acknowledgement of the received, selected number of encrypted data packets in the previous data packet communication frame and with instructions for a new data packet communication frame with a selected number of encrypted data packets and selected data packet lengths. The encryption process may continue with the session counter indicating the output from the most recently encrypted data packet being used to encrypt the first data packet within the new packet communication frame. The steps of the process may then repeat from block 540. Where the information handling system, the wireless dongle, or wireless I/O device is no longer initiated, such as turned off or entered a sleep mode, at block 590, the method 500 may end.

The blocks and steps of the flow diagrams of FIG. 5 or steps and aspects of the operation of the embodiments herein and discussed above such as at FIGS. 3 and 4 need not be necessarily performed in any given or specified order. It is contemplated that additional blocks, steps, or functions may be added, some blocks, steps or functions may not be performed, blocks, steps, or functions may occur contemporaneously, and blocks, steps, or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A wireless input/output (I/O) device wirelessly coupled to a wireless dongle of an information handling system comprising:

a microcontroller and a memory device;

the microcontroller to respond, via a wireless I/O wireless radio, to a transmitted polling packet from a wireless dongle requesting a selected number of packets within a data packet frame with the selected number of data packets within the data packet frame;

the microcontroller executing code instructions of a wireless I/O data signing protocol and authenticated encryption agent to:

execute a modular inverse function using a selected prime number to the first wireless I/O device input data payload to generate a signature used to authenticate the first data packet when received by the wireless dongle;

apply a first linear-feedback shift register (LFSR) to the signature with a first tap and within the packet frame to generate an LFSR distributed signature;

apply a second LFSR to the wireless I/O device input data payload with a second tap to generate an LFSR distributed payload; and execute an encryption algorithm with inputs of a shifting state machine output value from a third LFSR and a fourth LFSR and an initial key to generate a data packet encryption output value used in an exclusive OR (XOR) operator on the LFSR distributed signature and LFSR distributed payload to encrypt a first wireless I/O device input data packet, wherein the data packet encryption output value operates as a dynamic key for encryption of a second wireless I/O device input data packet in rounds of encryption until the selected number of packets for the data packet frame are encrypted for transmission to the wireless dongle.

2. The wireless I/O device of claim 1 further comprising:
the microcontroller executing code instructions of a wireless I/O data signing protocol and authenticated encryption agent to use a previous data packet encryption output value as the dynamic key with a shifted second state machine output in an encryption algorithm to generate a next data packet encryption output value to encrypt each subsequent encrypted wireless I/O device input data packet until the wireless I/O device or wireless dongle enters sleep mode or is turned off.

3. The wireless I/O device of claim 1 further comprising:
the microcontroller executing code instructions of the wireless I/O data signing protocol and authenticated encryption firmware to apply the XOR operator between the first data packet encryption output value, the LFSR distributed payload and LFSR distributed signature, and a whitening algorithm output to further conceal the first encrypted wireless I/O device input data packet.

4. The wireless I/O device of claim 3, wherein the whitening algorithm output is output from a fifth LFSR that uses a polynomial function transmitted from the wireless I/O device to the wireless dongle during a setup process between the wireless I/O device and wireless dongle.

5. The wireless I/O device of claim 1 further comprising:
the third LFSR and the fourth LFSR operate with distinct tap polynomial functions to each separately shift and each generate half of the shifting state machine function output.

6. The wireless I/O device of claim 1, wherein the modular inverse function using a selected prime number to is applied to each wireless I/O device input data payload to generate a signature for that wireless I/O device input data payload to be transmitted in the selected number of data packets in the data packet frame.

7. The wireless I/O device of claim 1 further comprising:
the microcontroller generating the initial key using a device nonce and a dongle nonce exchanged between the wireless I/O device and the wireless dongle by inputting the device nonce and dongle nonce into a secure hash algorithm (SHA)-256 to generate the initial key.

8. The wireless I/O device of claim 7 further comprising:
the microcontroller executing a random number generator to generate the device nonce.

9. A method of signing and encrypting a packet data stream, comprising:
with a microcontroller of a wireless input/output (I/O) device, receiving a transmitted polling packet from a wireless dongle, the polling packet including a selected number of packets and a selected packet length within a data packet frame and an acknowledgement of received packets sent to the operatively coupled wireless dongle;

executing code instructions of a wireless I/O data signing protocol and authenticated encryption agent, via a microcontroller, to execute a modular inverse function using a selected prime number to a payload of a wireless I/O device input data packet to generate a signature used to authenticate the first data packet when received by the wireless dongle;

applying a first linear-feedback shift register (LFSR) to the signature with a first tap to generate, via the microcontroller, an LFSR distributed signature, where the first LFSR shifts based on a polynomial function that is dynamic and selected from a stored polynomial library via an index value generated based on at least part of a dynamic key from an immediate previous data packet encryption;

applying a second LFSR to the payload with a second tap to generate, via the microcontroller, an LFSR distributed payload where the second LFSR shifts based on a polynomial function that is dynamic and selected from a stored polynomial library via an index value based on at least part of the dynamic key from an immediate previous data packet encryption; and executing an encryption algorithm, via the microcontroller, using the dynamic key from a previous data packet encryption round and a shifted state machine output from a third LFSR and a fourth LFSR to generate a data packet encryption output value;

executing an exclusive OR (XOR) operator, via the microcontroller, on the LFSR distributed signature and the LFSR distributed payload with the data packet encryption output value to encrypt the wireless I/O device input data packet as an encrypted data packet among the selected number of data packets for transmission within the data packet frame.

10. The method of claim 9 further comprising:
executing code instructions of a wireless I/O data signing protocol and authenticated encryption firmware to conduct plural data packet encryption rounds to encrypt the selected number of data packets for transmission within the data packet frame, wherein the data packet encryption output value generated in each data packet encryption round becomes the dynamic key in the next data packet encryption round.

11. The method of claim 9 further comprising:
executing code instructions of a wireless I/O data signing protocol and authenticated encryption firmware to apply the XOR operator between the data packet encryption output, the LFSR distributed signature and the LFSR distributed payload, and a whitening algorithm output to further conceal the first data packet encryption output and the LFSR distributed signature is generated by executing an XOR operation to the inverse modulus of the payload and a session key value.

12. The method of claim 11, wherein the whitening algorithm output is generated from a fifth LFSR that uses a polynomial function transmitted from the wireless I/O device to the wireless dongle during a setup process between the wireless I/O device and wireless dongle.

13. The method of claim 9 further comprising:
  executing code instructions of a wireless I/O data signing protocol and authenticated encryption firmware to conduct plural data packet encryption rounds to encrypt the selected number of data packets for transmission within the data packet frame; and
  separately shifting the third LFSR and the fourth LFSR with distinct tap polynomial functions generate the state machine function output that shifts between the plural data packet encryption rounds.

14. The method of claim 9, wherein applying the first linear-feedback shift register (LFSR) with the first tap and a session counter output that increases with each wireless I/O device input data packet within the data packet frame to the signature to generate, via the microcontroller, the LFSR distributed signature.

15. The method of claim 9 further comprising:
  generating, via the microcontroller, an initial key using a device nonce and a dongle nonce exchanged between the wireless I/O device and the wireless dongle by inputting the device nonce and dongle nonce into a secure hash algorithm (SHA)-256 to generate the initial key; and
  using the initial key as the first dynamic key in a first data packet encryption round for encrypting the selected number of wireless I/O device input data packets in the data packet frame.

16. The method of claim 9, wherein the encryption algorithm is an Advanced Encryption Standard-Electronic Codebook (AES-ECB) algorithm.

17. A wireless dongle of an information handling system comprising:
  a microcontroller and a memory device;
  the microcontroller to transmit a polling packet to a wireless I/O device, via a wireless dongle radio, with an instruction for a selected number of data packets and a selected packet length within a data packet frame for the wireless I/O device to transmit to the wireless dongle;
  the wireless dongle radio to receive a data packet frame from the wireless I/O device;
  the microcontroller executing code instructions of a wireless I/O data signing protocol and authenticated encryption system to:
    execute an encryption algorithm on a dynamic key from a previous decryption round and a state machine output value a third LFSR and a fourth LFSR to generate a data packet encryption output value;
    apply an exclusive OR (XOR) operator to a received encrypted wireless I/O device data packet in the data packet frame with the data packet encryption output value to yield an LFSR distributed signature and an LFSR distributed payload that is unencrypted;
    apply a first LFSR to the LFSR distributed signature to generate an unscrambled signature;
    apply a second LFSR to the LFSR distributed signature to generate an unscrambled wireless I/O device input data packet payload; and
    execute a modular inverse function using a selected prime number to signature to authenticate the wireless I/O device input data packet payload from the received encrypted wireless I/O device data packet;
  the microcontroller to provide the wireless I/O device input data packet payload to the information handling system.

18. The wireless dongle of claim 17 further comprising:
  the microcontroller executing code instructions of a wireless I/O data signing protocol and authenticated encryption firmware to conduct plural data packet decryption rounds to decrypt the selected number of data packets received within the data packet frame, wherein the data packet encryption output value generated in each data packet decryption round becomes the dynamic key in the next data packet decryption round.

19. The wireless dongle of claim 17 further comprising:
  the microcontroller executing code instructions of a wireless I/O data signing protocol and authenticated encryption firmware to conduct plural data packet decryption rounds to decrypt the selected number of data packets received within the data packet frame; and
  the microcontroller separately shifting the third LFSR and the fourth LFSR with distinct tap polynomial functions to generate the state machine function output that shifts between the plural data packet encryption rounds, where the third LFSR and the fourth LFSR have counterpart LFSRs operating at the wireless I/O device.

20. The wireless dongle of claim 17 wherein the encryption algorithm is an Advanced Encryption Standard-Electronic Codebook (AES-ECB) algorithm.

* * * * *